(12) United States Patent
Ikeda

(10) Patent No.: US 9,249,911 B2
(45) Date of Patent: Feb. 2, 2016

(54) FLEXIBLE EXPANSION JOINT

(75) Inventor: Shintaro Ikeda, Kusatsu (JP)

(73) Assignee: THE VICTAULIC CO., OF JAPAN, LTD., Tokyo-To (JP)

( * ) Notice: Subject to any disclaimer, the term of this patent is extended or adjusted under 35 U.S.C. 154(b) by 127 days.

(21) Appl. No.: 14/123,436

(22) PCT Filed: Jul. 5, 2012

(86) PCT No.: PCT/JP2012/067214
§ 371 (c)(1),
(2), (4) Date: Dec. 2, 2013

(87) PCT Pub. No.: WO2013/005802
PCT Pub. Date: Jan. 10, 2013

(65) Prior Publication Data
US 2014/0097613 A1    Apr. 10, 2014

(30) Foreign Application Priority Data

Jul. 6, 2011    (JP) .................................. 2011-149831

(51) Int. Cl.
| | | |
|---|---|---|
| *F16L 27/10* | (2006.01) | |
| *F16L 27/12* | (2006.01) | |
| *F16L 27/02* | (2006.01) | |
| *F16L 27/113* | (2006.01) | |

(52) U.S. Cl.
CPC ............... *F16L 27/12* (2013.01); *F16L 27/026* (2013.01); *F16L 27/113* (2013.01)

(58) Field of Classification Search
USPC ................. 285/302, 223, 95, 110, 108, 144.1, 285/145.1, 351, 48, 53, 121.1, 100, 45, 224, 285/231, 235, 298, 111
See application file for complete search history.

(56) References Cited

U.S. PATENT DOCUMENTS

| | | | | |
|---|---|---|---|---|
| 2,136,770 A | * | 11/1938 | Witzenmann ........... | F16L 11/18 138/120 |
| 2,373,280 A | * | 4/1945 | Weber ..................... | F16L 27/12 277/621 |
| 2,661,963 A | * | 12/1953 | Brown .................... | F16L 51/03 285/114 |

(Continued)

FOREIGN PATENT DOCUMENTS

| | | |
|---|---|---|
| JP | U-51-34718 | 3/1976 |
| JP | B2-57-41637 | 9/1982 |

(Continued)

OTHER PUBLICATIONS

International Saerch Report issued in International Patent Application No. PCT/JP2012/067214 mailed Aug. 21, 2012.

(Continued)

*Primary Examiner* — Aaron Dunwoody
(74) *Attorney, Agent, or Firm* — Oliff PLC

(57) ABSTRACT

A flexible expansion joint is capable coping with a great extension for its limited length. The flexible expansion joint includes: a first sleeve to be put on an end part of a first pipe; an outer sleeve to be put on an end part of a second pipe so as to overlap the first sleeve and capable of moving axially relative to the first sleeve; a first sealing member; a second sealing member; a third sealing member; a first length limiter including a first stopper for limiting the axial movement of the first pipe and the first sleeve relative to each other; and a second length limiter including a second stopper for limiting the axial movement of the second pipe the outer sleeve relative to each other.

19 Claims, 37 Drawing Sheets

(56) References Cited

U.S. PATENT DOCUMENTS

| | | | | |
|---|---|---|---|---|
| 2,976,064 A * | 3/1961 | Croy | ................... | F16L 27/00 285/13 |
| 3,396,992 A * | 8/1968 | Hale | ................... | F16L 27/04 285/100 |
| 3,458,219 A * | 7/1969 | Wesch | ................... | F16L 17/035 277/614 |
| 3,786,170 A * | 1/1974 | Floessel | ................... | H01R 35/02 174/13 |
| 3,799,586 A * | 3/1974 | Caras | ................... | F16L 27/04 285/111 |
| 4,221,405 A * | 9/1980 | Stonitsch | ................... | F16L 59/182 285/110 |
| 4,294,475 A * | 10/1981 | Kanai | ................... | F16L 27/12 285/145.4 |
| 4,597,413 A * | 7/1986 | Buseth | ................... | F16L 37/413 137/614.04 |
| 4,668,303 A * | 5/1987 | Weber | ................... | F16L 51/02 134/22.13 |
| 4,685,705 A * | 8/1987 | Jones | ................... | F16L 27/113 285/148.23 |
| 4,747,624 A * | 5/1988 | Faber | ................... | F01N 13/1811 277/625 |
| 4,838,582 A * | 6/1989 | Hatakeyama | ................... | F16L 27/113 277/626 |
| 4,915,177 A * | 4/1990 | Claycomb | ................... | E21B 17/1085 138/147 |
| 5,011,194 A * | 4/1991 | Nitta | ................... | F01N 13/1811 285/123.1 |
| 5,346,263 A * | 9/1994 | Huzenlaub | ................... | F16L 59/21 285/226 |
| 5,354,104 A * | 10/1994 | Senes | ................... | F16L 27/1017 285/223 |
| 5,573,284 A * | 11/1996 | Boyer | ................... | F16L 51/025 285/187 |
| 5,746,453 A * | 5/1998 | Roberts | ................... | F16L 59/185 285/298 |
| 6,371,524 B1 * | 4/2002 | Noda | ................... | F16L 27/12 285/110 |
| 6,752,434 B2 * | 6/2004 | Cummins | ................... | F16L 27/12 138/26 |
| 8,172,272 B2 * | 5/2012 | Petit | ................... | F16L 39/005 285/123.12 |
| 2006/0197342 A1 * | 9/2006 | Yen | ................... | F16L 15/02 285/298 |

FOREIGN PATENT DOCUMENTS

| | | |
|---|---|---|
| JP | U-62-92387 | 6/1987 |
| JP | A-10-89573 | 4/1998 |
| JP | Y2-2591664 | 3/1999 |
| JP | A-2000-205472 | 7/2000 |
| JP | A-2002-147671 | 5/2002 |
| JP | A-2003-14179 | 1/2003 |
| JP | A-2008-180323 | 8/2008 |

OTHER PUBLICATIONS

May 21, 2013 International Preliminary Report on Patentability issued in International Patent Application No. PCT/JP2012/067214 (with English-language translation).

* cited by examiner (A)
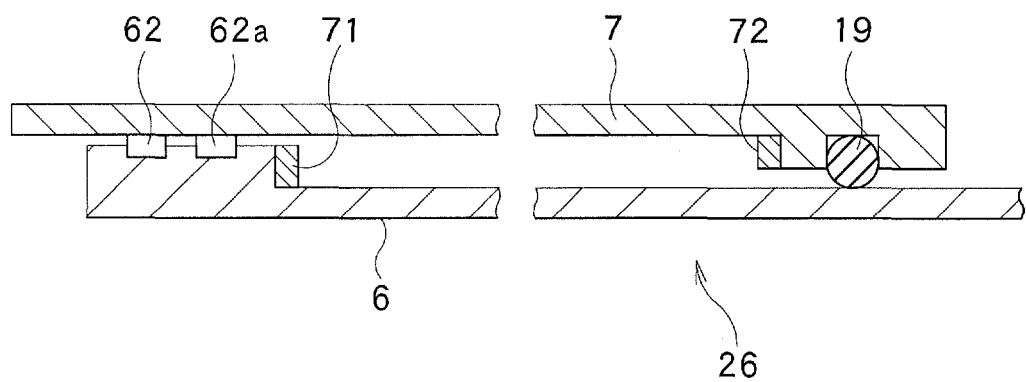
(B)
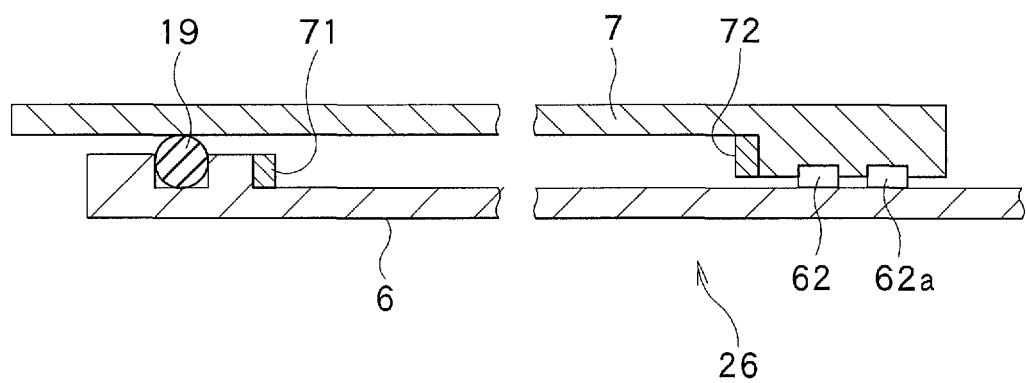
FIG.41

FLEXIBLE EXPANSION JOINT

TECHNICAL FIELD

The present invention relates to a flexible expansion joint and, more particularly, to a flexible expansion joint having sleeves to be fit over pipes, respectively, without being specially worked and without requiring the ends of the pipes being specially worked and of coping with changes in distance between the ends of the pipes.

BACKGROUND ART

Flexible expansion joints need to deal with bending and expansion of pipelines. Metal bellows expansion joints are well known conventional flexible expansion joints. Metal bellows expansion joints deform repeatedly to deal with the bending and expansion of pipelines and hence are liable to subject to metal fatigue. Considerably strong force needs to be applied to metal bellows expansion joints to deform the same and hence metal bellows expansion joints cannot be easily deformed.

A flexible expansion joint disclosed in, for example, JP 2008-180323 A for connecting pipes is capable of being fit over ends of the pipes respectively, without being specially worked and without requiring specially working the ends of the pipes.

FIGS. 1 to 3 show a pipeline including a pipe 1, a pipe 2, and a flexible expansion joint 100 connecting the pipes 1 and 2. The flexible expansion joint 100 has sleeves and sealing members.

FIG. 1 shows the flexible expansion joint 100 in a state where the pipes 1 and 2 connected by the flexible expansion joint 100 are coaxial and the axial distance between the respective ends of the pipes 1 and 2 is fixed.

FIG. 2 shows the flexible expansion joint 100 in a state where the axial distance between the respective ends of the pipes 1 and 2 connected by the flexible expansion joint 100 is not changed, the respective axes of the pipes 1 and 2 are separated from each other by a coaxiality deviation δ and the axis of the flexible expansion joint 100 is inclined at an angle θ1 to an axial direction. In the state shown in FIG. 2, the pipeline has an expansion allowance E.

FIG. 3 shows the flexible expansion joint 100 in a state where the axial distance between the respective ends of the pipes 1 and 2 connected by the flexible expansion joint 100 is changed, the respective axes of the pipes 1 and 2 are separated from each other by a coaxiality deviation δ, the axis of the flexible expansion joint 100 is inclined at an angle θ1 to the axial direction and the pipeline is elongate by an allowable axial length A.

Patent Document 1: JP2008-180323A

DISCLOSURE OF THE INVENTION

Problem to be Solved by the Invention

Under an unexpected strong earthquake or an unexpected liquefaction of the ground, it is possible that a change in the distance between the respective ends of the pipes 1 and 2 increases beyond the allowable axial length A. In such a case, the flexible expansion joint 100 is unable keep connecting the pipes 1 and 2 in a liquid-tight sealed state.

A possible means for increasing the allowable axial length A may be increasing the length of the flexible expansion joint 100.

However the allowable value of the coaxiality deviation δ between the respective axes of the pipes 1 and 2 is reduced unless the diameter of the flexible expansion joint 100 is increased, and hence there is a limit to increasing the length of the flexible expansion joint 100 to increase the allowable axial length A. The length of the flexible expansion joint 100 is dependent on the condition under which the flexible expansion joint 100 is used. In most cases, the flexible expansion joint 100 needs to be formed in a compact construction.

Accordingly, it is an object of the present invention to provide a flexible expansion joint capable of solving problems in the conventional techniques and of coping with a long extension for its limited length.

Means for Solving the Problem

The present invention provides a flexible expansion joint for connecting a first pipe and a second pipe such that the first pipe and the second pipe are movable and bendable relative to each other, including: a first sleeve to be put on one end part of the first pipe; an outer sleeve to be put on one end part of a second pipe so as to overlap the first sleeve and capable of moving axially relative to the first sleeve; a first sealing member sealing a gap between the inside surface of the first sleeve and the outside surface of the first pipe in a liquid-tight sealed state such that the first sleeve and the first pipe are axially movable relative to each other; a second sealing member sealing a gap between the inside surface of the outer sleeve and the outside surface of the second pipe in a liquid-tight sealed state such that the outer sleeve and the second pipe are axially movable relative to each other; a third sealing member sealing a gap between the outside surface of the first sleeve and the inside surface of the outer sleeve in a liquid-tight sealed state such that the first sleeve and the outer sleeve are axially movable relative to each other; a first length limiter including a first reference member placed on the first pipe, a first reference holder formed on the first sleeve, and a first stopper for limiting the axial movement of the first pipe and the first sleeve relative to each other to a predetermined first limit length, the first sealing member being unable to maintain the gap between the inside surface of the first sleeve and the outside surface of the first pipe in a liquid-tight sealed state when a distance between the first reference member and the first reference holder exceeds the predetermined first limit length; and second length limiter including a second reference member placed on the second pipe, a second reference holder formed on the outer sleeve, and a second stopper for limiting the axial movement of the second pipe and the outer sleeve relative to each other to a predetermined second limit length, the second sealing member being unable to maintain the gap between the inside surface of the outer sleeve and the outside surface of the second pipe in a liquid-tight sealed state when a distance between the second reference member and the second reference holder exceeds the predetermined second limit length.

The outer sleeve is a single sleeve overlapping the first sleeve.

The outer sleeve is a composite sleeve including plural nested component sleeves.

The first sealing member defines a first gap between the inside surface of the first sleeve and the outside surface of the first pipe, the second sealing member defines a second gap between the outside surface of the second pipe and the inside surface of the outer sleeve, and the first and the second sealing member permit the first and the second pipe to bend relative to each other within a desired range and deform such that the respective sizes of the first and the second gap are adjusted automatically.

At least the first and the second sealing member among the first, the second and the sealing member are lip sealing members.

The first stopper includes a first bolt extended between the first reference member and the first reference holder, and a first nut put on the first bolt. The distance between the first reference member and the first reference holder is equal to the predetermined first limit length when the first nut is in contact with the first reference member or the first reference holder. The second stopper includes a second bolt extended between the second reference member and the second reference holder, and a second nut put on the second bolt. The distance between the second reference member and the second reference holder is equal to the predetermined second limit length when the second nut is in contact with the second reference member or the second reference holder.

The first stopper includes a first plate extended between the first reference member and the first reference holder and provided with a first axial slot, and a first guide member for guiding the first plate for movement along the first slot. The distance between the first reference member and the first reference holder is equal to the predetermined first limit length when the first guide member is at one end of the first slot. The second stopper includes a second plate extended between the second reference member and the second reference holder and provided with a second axial slot, and a second guide member for guiding the second plate for movement along the second axial slot. The distance between the second reference member and the second reference holder is equal to the predetermined second limit length when the second guide member is at one end of the second axial slot.

The first stopper includes a first turning member having one end pivotally supported on the first reference member, a first bending member having one end pivotally supported on the first reference holder, and a first pivot pin pivotally connecting the other end of the first turning member and the other end of the first bending member. The distance between the first reference member and the first reference holder is equal to the predetermined first limit length when the first turning member and the first bending member extend straight. The second stopper includes a second turning member having one end pivotally supported on the second reference member, a second bending member having one end pivotally supported on the second reference holder, and a second pivot pin pivotally connecting the other end of the second turning member and the other end of the second bending member. The distance between the second reference member and the second reference holder is equal to the second limit length when the second turning member and the second bending member extend straight.

The first stopper is a first string of a length equal to the predetermined first limit length, and the second stopper is a second string of a length equal to the predetermined second limit length.

The third sealing member is held by a pair of flanges at a position near one end of the outer sleeve.

The flexible expansion joint further includes a brake capable of maintaining the first sleeve and the outer sleeve in a stationary nested state when an external force acting on the first sleeve so as to move the first sleeve in a direction opposite a direction in which the end of the first pipe faces and acting on the outer sleeve so as to move the outer sleeve in a direction opposite a direction in which the end of the second pipe faces is not higher than a predetermined threshold, and of nullifying the stationary nested state to allow the movement of the first sleeve and the outer sleeve relative to each other when the external force is higher than the predetermined threshold.

The outer sleeve includes plural nested component sleeves, an outer brake is placed in a space between the inner component sleeve and the outer component sleeve adjacent to the inner component sleeve among the plural component sleeves to restrain the axial movement of the outer component sleeve relative to the inner component sleeve.

The brake includes a friction member fixed to the outer sleeve so as to be in frictional contact with the outside surface of the first sleeve, and capable of moving together with the first sleeve when the external force is not higher than the threshold and of permitting the axial movement of the outer sleeve relative to the first sleeve when the external force is higher than the threshold.

The brake has a fuse extended between the outer sleeve and the first sleeve, and capable of remaining extended between the outer sleeve and the first sleeve while the external force is not higher than the threshold force and of breaking when the external force exceeds the threshold.

One of the first, the second and the third sealing member has functions of a supplementary brake for restraining the axial movement of the outer sleeve relative to the first sleeve.

The flexible expansion joint further includes a first fixed member placed on the first reference holder on the first sleeve or placed near the first reference holder, a second fixed member placed on the second reference holder on the outer sleeve or placed near the second reference holder, and a third stopper for limiting the axial movement of the first sleeve and the outer sleeve relative to each other to a predetermined third limit length, the third sealing member being unable to maintain the gap between the outside surface of the first sleeve and the inside surface of the outer sleeve in a liquid-tight sealed state when a distance between the first fixed member and the second fixed member exceeds the predetermined third limit length.

The third stopper includes a slotted plate having one end attached to either the first fixed member or the second fixed member and provided with a third axial slot, and a guide member having one end attached to either the second fixed member or the first fixed member and having a guide part fitted in the third slot, and the distance between the first and the second fixed member is equal to the predetermined third limit length when the guide part is at one end of the third slot.

The third stopper is a third string of a length equal to the predetermined third limit length.

The flexible expansion joint further includes a third length limiter including a first protrusion protruding from the outside surface of one axial end of the first sleeve, and a second protrusion protruding from the inside surface of the other axial end of the outer sleeve and capable of coming into contact with the first protrusion. The first and the second protrusion come into contact with each other to limit the distance between the first and the second reference holder to a length not longer than a predetermined third limit length equivalent to an allowable limit length at a length above which the third sealing member is unable to maintain the gap between the first sleeve and the outer sleeve in a liquid-tight sealed state.

Since the first sleeve and the outer sleeve are nested so as to be axially movable relative to each other, the flexible expansion joint can be lengthened by a length equal to the length of the overlapping parts of the first sleeve and the outer sleeve in addition to a length equal to the addition of the first and the second limit length.

When the outer sleeve includes the plural nested component sleeves, a length by which the flexible expansion joint can be lengthened can be increased even if the length of the outer sleeve is limited.

The first sealing member defines the first gap between the inside surface of the first sleeve and the outside surface of the first pipe, the second sealing member defines the second gap between the outside surface of the second pipe and the inside surface of the outer sleeve, and the first and the second sealing member deform so as to adjust the respective sizes of the first and the second gap automatically to permit the first and the second pipe to bend relative to each other in a desired range.

When at least the first and the second sealing member among the first, the second and the third sealing member are flexibly deformable lip sealing members, the first and the second sealing members can easily cope with the angular movement of the first and the second pipe relative to each other without deteriorating their sealing effect.

Since the first stopper includes the first bolt and the first nut, and the second stopper includes the second bolt and the second nut put on the second bolt, the first and the second length limiter can be easily and firmly formed.

Since the first stopper includes the first plate provided with the first axial slot, and the first guide member for guiding the first plate for movement along the first slot, and the second stopper includes the second plate provided with the second axial slot, and the second guide member for guiding the second plate for movement along the second axial slot, the first and the second length limiter can be easily and firmly formed.

Since the first stopper includes the first turning member having one end pivotally supported on the first reference member, the first bending member having one end pivotally supported on the first reference holder, and the first pivot pin pivotally connecting the other end of the first turning member and the other end of the first bending member, and the second stopper includes the second turning member having one end pivotally supported o the second reference member, the second bending member having one end pivotally supported on the second reference holder, and the second pivot pin pivotally connecting the other end of the second turning member and the other end of the second bending member, the first and the second length limiter can be easily and firmly formed.

Since the first stopper is the first string of the predetermined first limit length, and the second stopper is the second string of the predetermined second limit length, the first and the second length limiter can be easily and firmly formed.

Since the flexible expansion joint includes the brake, the flexible expansion joint can lengthen first by a length equal to the addition of the predetermined first and the second limit length, and can further lengthen after surely separating the nested first sleeve and the outer sleeve when the value of the threshold is determined properly.

The brake including the friction member can be easily formed.

The brake including the fuse extended between the outer sleeve and the first sleeve can be easily formed.

One of the first, the second and the third sealing member having functions of a supplementary brake reduces load on the brake.

Since the flexible expansion joint further includes the third length limiter including the first fixed member, the second fixed member and the third stopper, the flexible expansion joint can lengthen to a length equal to the predetermined third limit length, and the liquid-tightly sealed relation between the outer sleeve and the first sleeve can be maintained by the third sealing member.

The third stopper includes the slotted plate having one end attached to either the first fixed member or the second fixed member and provided with the third axial slot, and the guide member having one end attached to either the second fixed member or the first fixed member and a guide part fitted in the third slot. Therefore, the third length limiter can be easily and firmly formed.

Since the third stopper includes the third string of the predetermined third limit length, the third length limiter can be formed in a simple mechanism.

The third length limiter includes the first protrusion protruding from the outside surface of one axial end of the first sleeve, and the second protrusion protruding from the inside surface of the other axial end of the outer sleeve and capable of coming into contact with the first protrusion. The first and the second protrusion come into contact with each other to ensure that the distance between the first and the second reference holder does not exceed the predetermined third limit length equivalent to an allowable limit length at a length below which the third sealing member can maintain the gap between the first sleeve and the outer sleeve in a liquid-tight sealed state, and third length limiter is interposed between the first sleeve and the outer sleeve. Therefore, the third length limiter is concealed from view from outside and has a simple appearance. The third length limiter will not be directly shocked by external impacts and, hence high safety of the function of the third length limiter can be ensured.

BRIEF DESCRIPTION OF THE DRAWINGS

FIGS. 41(A) and 41(B) are views of assistance in describing a third length limiter of the eleventh embodiment of the present invention.

BEST MODE FOR CARRYING OUT THE INVENTION

Preferred embodiments of the present invention will be described with reference to the accompanying drawings.

A first embodiment of the present invention will be described with reference to FIG. 4.

Figure 1:
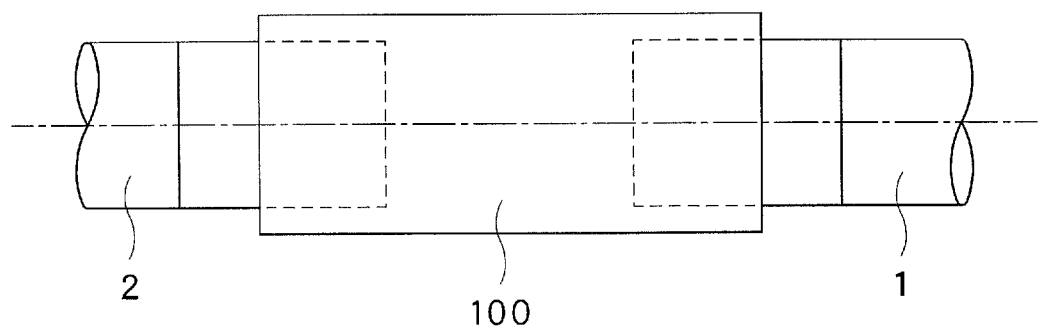
FIG. 1 is a typical view showing a pipeline including a conventional flexible expansion joint connecting pipes, in which the distance between the pipes is fixed and the pipes are coaxial.
Figure 2:
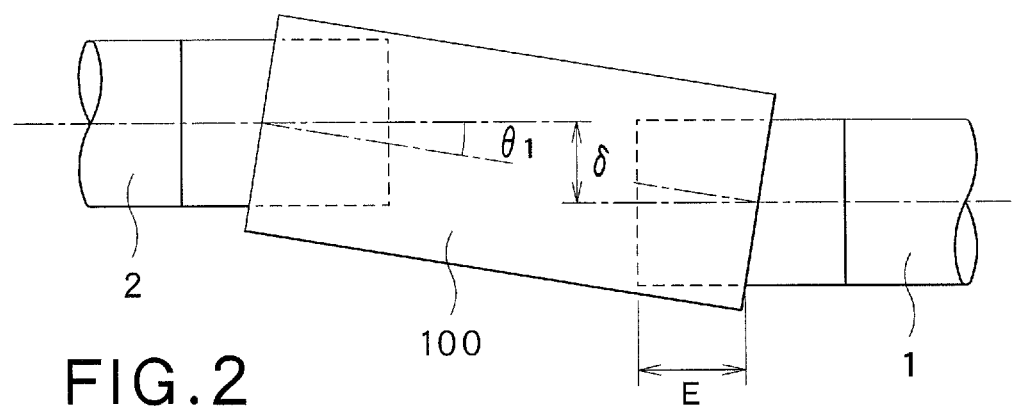
FIG. 2 is a typical view showing a pipeline including a conventional flexible expansion joint connecting pipes, in which the distance between the pipes is not changed and the pipes are not coaxial.
Figure 3:
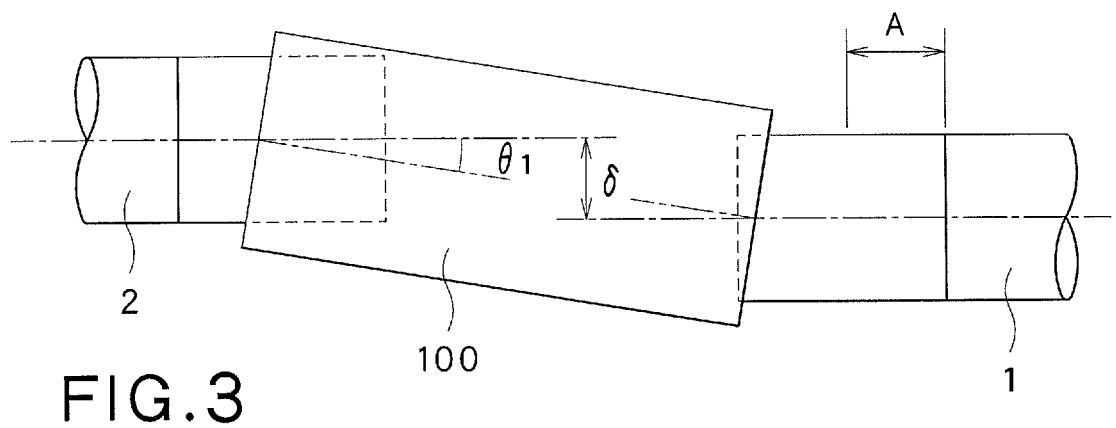
FIG. 3 is a typical view showing a pipeline including a conventional flexible expansion joint connecting pipes, in which the axial distance between the respective ends of the pipes connected by the flexible expansion joint is changed, and the pipes are not coaxial.
Figure 4:
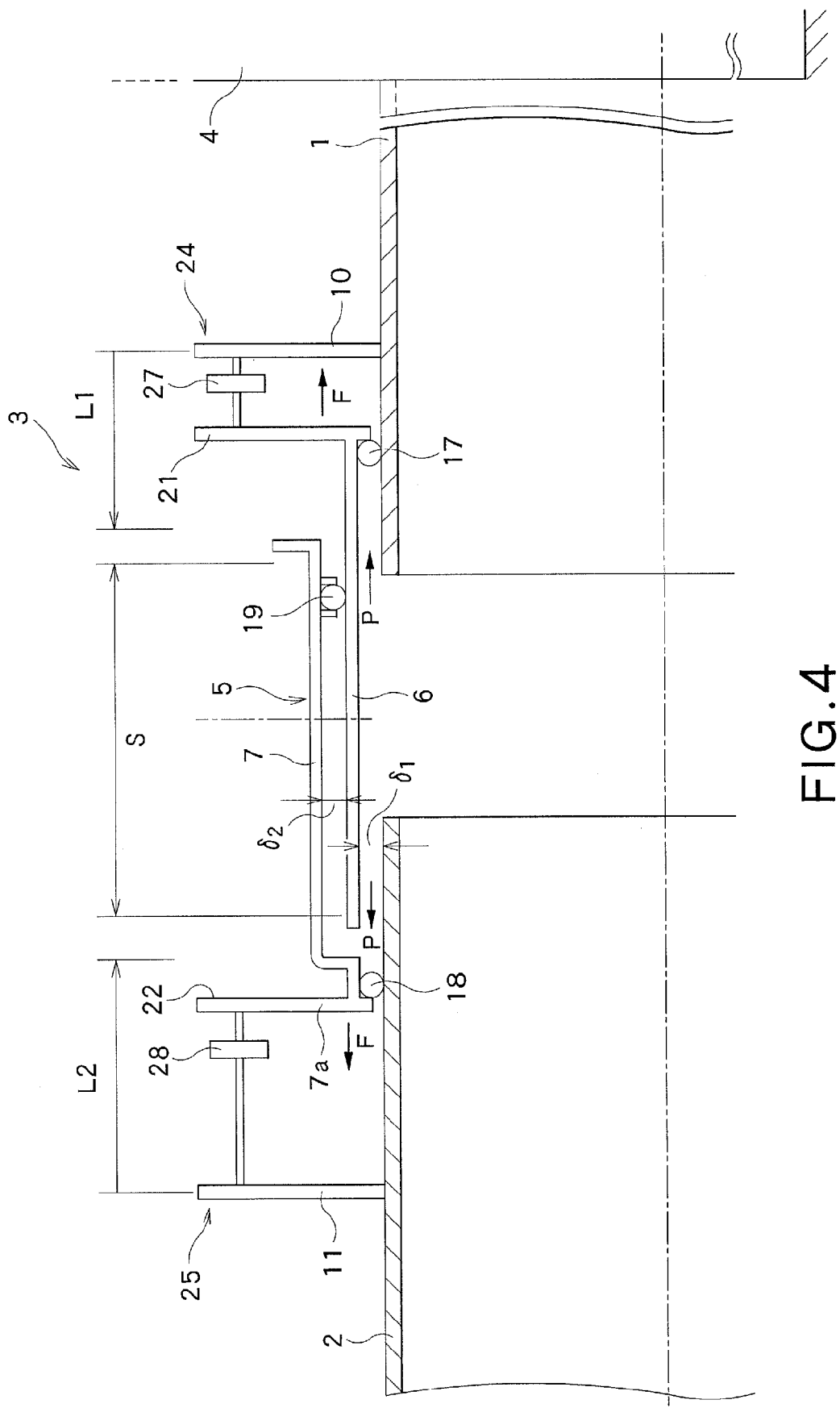
FIG. 4 is a schematic view showing a first embodiment of the present invention.

Referring to FIG. 4, a first pipe 1 is connected to a building built, for example, in a hydraulic power station and is connected to a second pipe 2 by a flexible expansion joint 3 provided with a tubular sleeve 5 such that the pipes 1 and 2 are bendable relative to each other and the distance between the pipes 1 and 2 is changeable. The first pipe 1, the second pipe 2 and the flexible expansion joint 3 are laid in the sea or laid underground.

The sleeve 5 of the flexible expansion joint 3 includes a tubular first sleeve 6 put on an end part of the first pipe so as to surround the respective end parts of the first pipe 1 and the second pipe 2, and a tubular outer sleeve 7 overlapping the first sleeve 6. The outer sleeve 7 is axially movable relative to the first sleeve 6 between an initial position where the first sleeve 6 is fully nested in the outer sleeve 7 and a separated position where the outer sleeve 7 is separated from the first sleeve 6. In this embodiment, the outer sleeve 7 is a single outer sleeve to be placed so as to overlap the first sleeve 6. The outer sleeve 7 may be a composite sleeve including plural nested component sleeves.

The flexible expansion joint 3 is provided with a first sealing member 17, a second sealing member 18 and a third sealing member 19.

The first sealing member 17 seals a gap between the inside surface of the first sleeve 6 and the outside surface of an end part of the first pipe 1 in a liquid-tight state and permits the first sleeve 6 and the first pipe 1 to move axially relative to each other.

Figure 14:
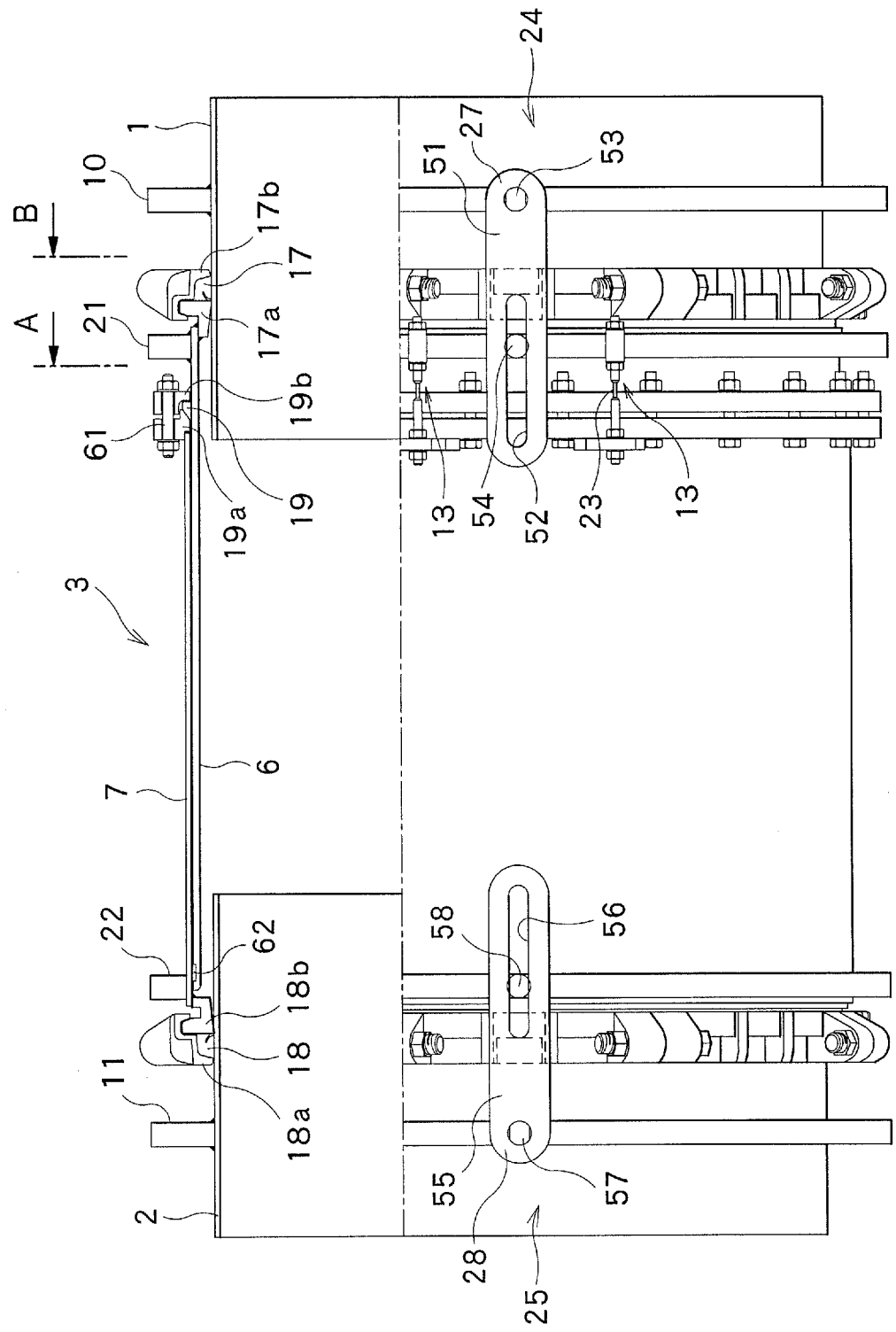
FIG. 14 is a schematic view showing an eighth embodiment of the present invention, in which pipes are coaxial and the distance between the pipes is fixed.

As shown in FIG. 4, the first sealing member 17 may be placed so as to be held between the inside surface of the first sleeve 6 and the outside surface of the first pipe 1 or may be placed, for example, in contact with an end of the first sleeve 6 as shown in FIG. 14 to seal the gap between the inside surface of the first sleeve 6 and the outside surface of the first pipe 1 in a liquid-tight state.

The second sealing member 18 seals the gap between the inside surface of the outer sleeve 7 and the outside surface of the second pipe 2 in a liquid-tight state and permits the outer sleeve 7 and the second pipe to move axially relative to each other.

There are various methods of holding the second sealing member 18 between the inside surface of the outer sleeve 7 and the outside surface of the second pipe 2. For example, a bend may be formed in an end part of the outer sleeve 7 so as to surround the second sealing member 18. The second sealing member 18 may be placed, for example, at one end of the outer sleeve 7 as shown in FIG. 14 to seal the gap between the inside surface of the outer sleeve 7 and the outside surface of the second pipe 2 in a liquid-tight state.

The third sealing member 19 seals a gap between the outside surface of the first sleeve 6 and the inside surface of the outer sleeve 7 in a liquid-tight state and permits the first sleeve 6 and the outer sleeve 7 to move axially relative to each other.

There are various methods of holding the third sealing member 19 between the inside surface of the outer sleeve 7 and the outside surface of the first sleeve 6. For example, an annular groove for holding the third sealing member 19 between the outside surface of the first sleeve 6 and the inside surface of the outer sleeve 7 may be formed in the inside surface of the outer sleeve 7. The third sealing member 19 may be placed, for example, at the other end of the outer sleeve 7 as shown in FIG. 14 to seal a gap between the outside surface of the first sleeve 6 and the inside surface of the outer sleeve 7 in a liquid-tight state.

The flexible expansion joint 3 has a first length limiter 24 including a first reference member 10 fixed to the first pipe 1, a first reference holder 21 fixed to the first sleeve 6, and a first stopper 27 for limiting the axial movement of the first sleeve 6 relative to the first pipe 1 such that the distance between the first reference member 10 and the first reference holder 21 may not exceed a predetermined first limit length L1 at a length below which the first sealing member 17 can seal a gap between the first sleeve 6 and the first pipe 1 in a liquid-tight state.

The flexible expansion joint 3 includes a second reference member 11 fixed to the second pipe 2, a second reference holder 22 formed on the outer sleeve 7, and a second length limiter 25 provided with a second stopper 28 for limiting the axial movement of the second pipe 2 and the outer sleeve 7 relative to each other to a second limit length L2 at a length above which the second sealing member 18 is unable to maintain the gap between the outer sleeve 7 and the second pipe 2 in a liquid-tight sealed state. Normally, the first limit length L1 and the second limit length L2 are equal. The first limit length L1 and the second limit length L2 may be different.

Although the first sealing member 17, the second sealing members 18 and the third sealing member 19 shown in FIG. 4 are represented typically by O rings, it is desirable that the first sealing member 17, the second sealing members 18 and the third sealing member 19 are automatic sealing members capable of automatically deforming under an internal pressure or an external pressure to maintain their sealing effect automatically.

The first sealing member 17 defines a first gap $\delta 1$ between the inside surface of the first sleeve 6 and the outside surface of an end part of the first pipe 1. The second sealing member 18 and the third sealing member 19 define, for example, a second gap $\delta 2$ substantially equal to the first gap $\delta 1$ between the outside surface of the first sleeve 6 and the inside surface of the outer sleeve 7. The first gap $\delta 1$ and the second gap $\delta 2$ permit the first pipe 1 and the second pipe 2 to bend within a predetermined range in which the first pipe 1 and the second pipe 2 are expected to bend to each other.

As shown in embodiments which will be described below, it is desirable that the first sealing member 17 and the second sealing member 18 are lip sealing members. When the first sealing member 17 and the second sealing member 18 are lip sealing members, the first sealing member 17 and the second sealing member 18 permit the first pipe 1 and the second pipe 2 to bend relative to each other within a presumed range and deform to adjust the sizes of the first gap and the second gap $\delta 2$ automatically.

A fluid flows through the flexible expansion joint 3 connecting the first pipe 1 and the second pipe 2. As shown in FIG. 4, a pressure P acts on the inside surface of the first sleeve 6 and the pressure P produces an external force F acting on the first sleeve 6 so as to drive the first sleeve 6 in a direction opposite a direction in which the end of the first pipe 1 faces. Similarly, a pressure P acts on the inside surface of the outer sleeve 7 and the pressure P produces an external force F acting on the outer sleeve 7 so as to drive the outer sleeve 7 in a direction opposite a direction in which the end of the second pipe 2 faces.

The external force F is the sum of forces produced by the pressure P acting on the outside surface of the first sleeve 6 and the inside surface of the outer sleeve 7 and causing the movement of the outer sleeve 7 relative to the first sleeve 6.

In an initial state in which the flexible expansion joint 3 is installed at a specified site, the first sleeve 6 and the outer sleeve 7 are fully nested. In the initial state, the axial length of the respective overlapping parts of the first sleeve 6 and the outer sleeve 7 is an overlap length S. While the magnitude of the external force F is normal, the first sleeve 6 and the outer sleeve remain in the initial nested state in which the first sleeve 6 and the outer sleeve 7 are nested when the flexible expansion joint 3 is installed in the initial state.

Suppose that a high external force F acts on the flexible expansion joint 3 due to an earthquake or such. Then, the first sleeve 6 and the first pipe 1 can move axially relative to each other maintaining the liquid-tight sealing effect until the distance between the first reference member 10 and the first reference holder 21 reaches the predetermined first limit length L1. Similarly, the outer sleeve 7 and the second pipe 2 can move axially relative to each other maintaining the liquid-tight sealing effect until the distance between the second reference member 11 and the second reference holder 22 reaches the predetermined second limit length L2. Therefore, the first pipe 1 and the second pipe can move away from each other until the distance between the respective ends of the first pipe 1 and the second pipe 2 reaches at least a distance L1+L2.

In this embodiment, the gap between the first sleeve 6 and the outer sleeve 7 is sealed in a liquid-tight state by the third sealing member 19 such that the first sleeve 6 and the second sleeve 7 can axially move relative to each other. This embodiment is not provided with any limiting mechanism for limiting the axial movement of the first sleeve 6 and the second sleeve 7 relative to each other.

However, the third sealing member 19 can maintain the liquid-tight state permitting the first sleeve 6 and the second sleeve 7 to move axially relative to each other when the overlap length S by which the first sleeve 6 and the second sleeve 7 overlap each other is sufficiently long.

It is empirically known that the distance between the first reference member 10 and the first reference holder 21 and the distance between the second reference member 11 and the second reference holder 22 are liable to start increasing before the distance between the first sleeve 6 and the second sleeve 7 starts increasing when the flexible expansion joint 3 is caused to lengthen by a high external force F. Normally, it is supposed that the flexible expansion joint 3 lengthens first by the length L1+L2 under the functions of the first length limiter 24 and the second length limiter 25 and then, if necessary, the first sleeve 6 and the second sleeve 7 move further axially relative to each other by a length not exceeding the overlap length S.

As mentioned above, since the first sleeve 6 and the second sleeve 7 of the flexible expansion joint 3 in this embodiment overlap each other by the long overlap length S, the flexible expansion joint 3 can lengthen by the length L1+L2 and can lengthen by a length nearly equal to the overlap length S in addition to the length L1+L2.

The inside surface of the first sleeve 6 and the outside surface of the first pipe 1 are spaced apart by the first sealing member 17, and the inside surface of the outer sleeve 7 and the outside surface of the second pipe 2 are spaced apart by the second sealing member 18. Therefore, the first gap δ1 and the second gap δ2 are automatically adjusted through the deformation of the first sealing member 17 and the second sealing member 18 to permit the first pipe 1 and the second pipe 2 to bend relative to each other. When the first sealing member 17 and the second sealing member 18 are lip sealing members, it is possible to permit simply the first pipe 1 and the second pipe 2 to bend relative to each other in a desired range.

A flexible expansion joint 3 in a second embodiment of the present invention will be described with reference to FIG. 5.

Figure 5:
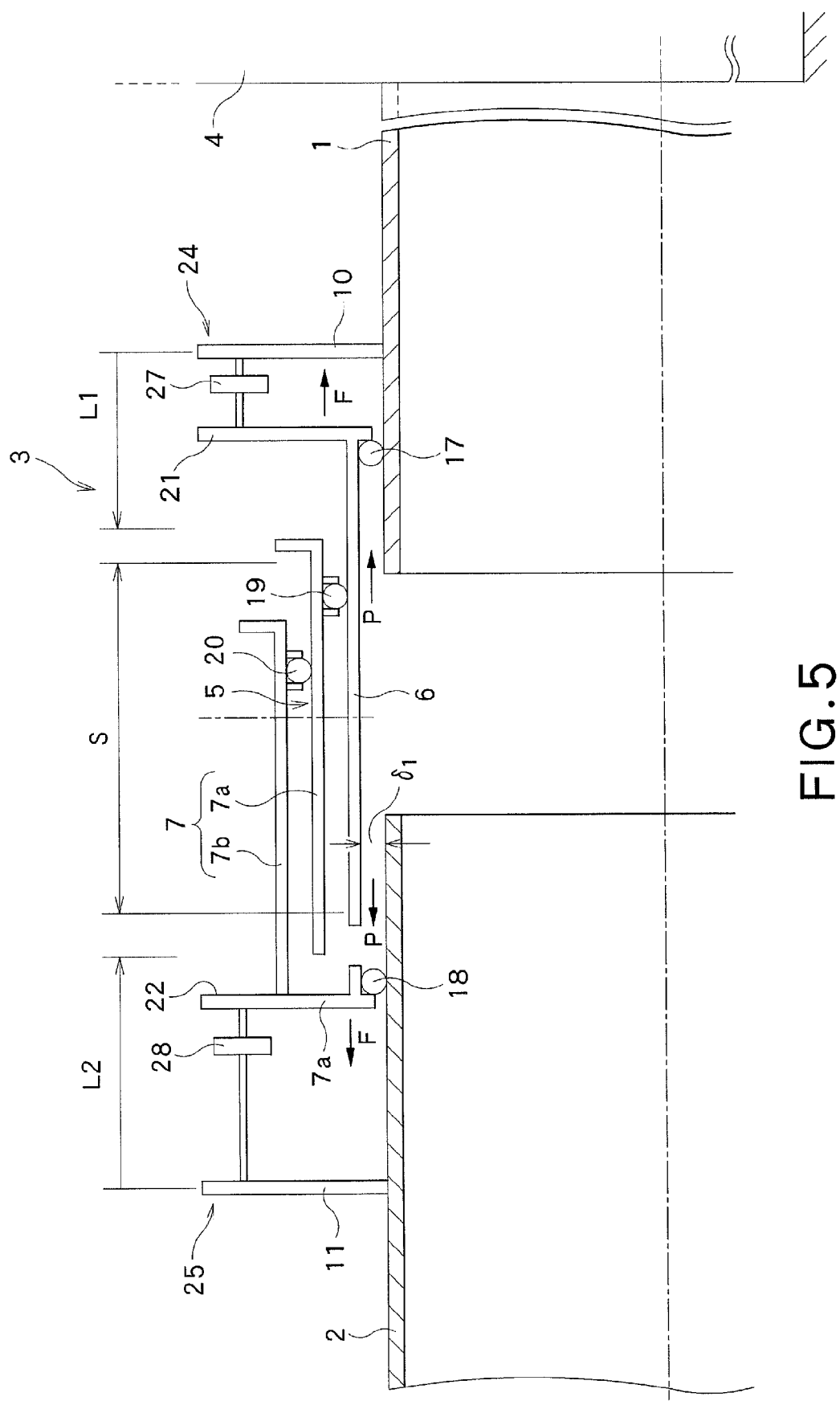
FIG. 5 is a schematic view showing a second embodiment of the present invention.

Whereas the outer sleeve 7 is a single sleeve overlapping the first sleeve 6 in the flexible expansion joint 3 shown in FIG. 4, an outer sleeve 7 of the embodiment shown in FIG. 5 includes plural component sleeves, such as, for example, two component sleeves namely, an inner component sleeve 7a and an outer component sleeve 7b overlapping the inner component sleeve 7a.

A fourth sealing member 20 is held between the inner component sleeve 7a and the outer component sleeve 7b. The fourth sealing member 20 seals a gap between the outside surface of the inner component sleeve 7a and the inside surface of the outer component sleeve 7b in a liquid-tight state such that the inner component sleeve 7a and the outer component sleeve can axially move relative to each other.

Since the outer sleeve 7 of this embodiment includes the inner component sleeve 7a and the outer component sleeve 7b combined by nesting, the flexible expansion joint 3 can axially lengthen by a length equal to the sum of a length L1, a length L2 and a length 2S.

Three or more component sleeves may be used instead of the two component sleeves 7a and 7b. When three or more component sleeves are used, sealing members may be held each between the adjacent component sleeves like the fourth sealing member 20. When n component sleeves are used, the flexible expansion joint 3 can axially lengthen by a length equal to the sum of a length L1, a length L2 and a length nS.

Figure 6:
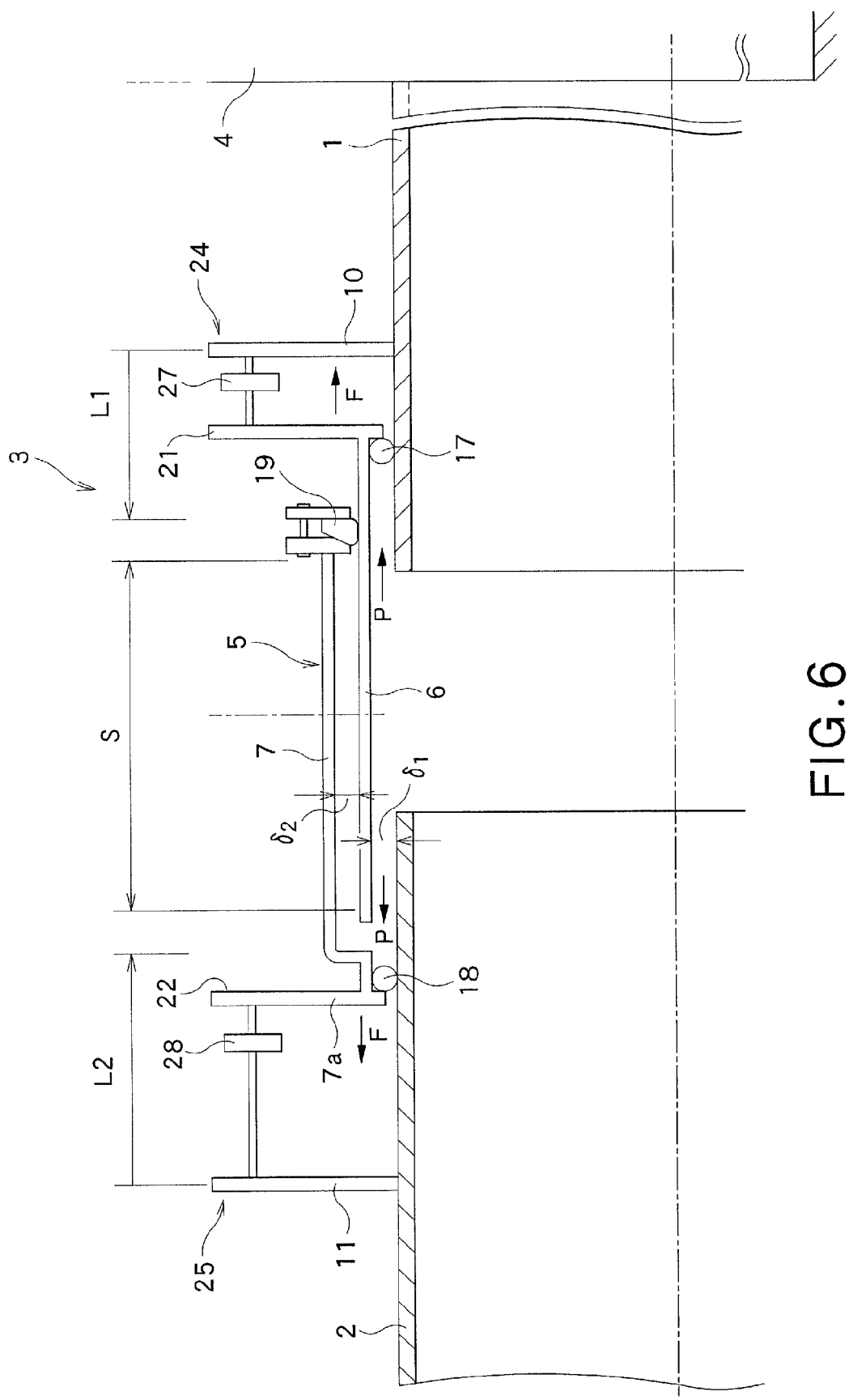
FIG. 6 is a schematic view showing a third embodiment of the present invention.

A flexible expansion joint 3 in a third embodiment of the present invention will be described with reference to FIG. 6.

In the flexible expansion joint 3 in the first embodiment shown in FIG. 4, the third sealing member 19 is held between the outside surface of the first sleeve 6 and the inside surface of the outer sleeve 7 and seals the gap between the first sleeve 6 and the outer sleeve 7 in a liquid-tight state such that the first sleeve 6 and the outer sleeve 7 can axially move relative to each other. In the flexible expansion joint 3 in the third embodiment, a third sealing member 19 is held between one end of an outer sleeve 7 and the outside surface of a first sleeve 6. The third sealing member 19 can be held by a simple mechanism.

When the arrangement of the third sealing member 19 of the third embodiment is applied to the second embodiment shown in FIG. 5, the third sealing member 19 is held between one end of the outer component sleeve 7b and the outside surface of the inner component sleeve 7a.

Although the arrangement of the third sealing member 19 has been described with reference to FIG. 6, the arrangement of the first sealing member 17 and the second sealing member 18 may be similar to that of the third sealing member 19.

The first sealing member 27 may be disposed at one end of the first sleeve 6 to seal the gap between the inside surface of the first sleeve 6 and the outside surface of a first pipe 1 in a liquid-tight state, and the second sealing member 18 may be disposed at an end of the outer sleeve 7 to seal a gap between the inside surface of the outer sleeve 7 and the outside surface of a second pipe 2 in a liquid-tight sealed state.

A flexible expansion joint 3 in a fourth embodiment of the present invention will be described with reference to FIG. 7. The fourth embodiment is formed by adding a third length limiter 26 to the first embodiment shown in FIG. 4.

The third length limiter 26 includes a first fixed member 31 disposed on or near a first reference holder 21 on a first sleeve 6, a second fixed member 32 disposed on or near a second reference holder 22, and a third stopper 29. The third stopper 29 limits the axial movement of the first sleeve 6 and the outer sleeve 7 relative to each other such that the distance between the first fixed member 31 and the second fixed member 32 may not exceed a predetermined third limit length L3. When the distance between the first fixed member 31 and the second fixed member 32 is not greater than the third limit length L3, the third sealing member 19 can maintain sealing the gap between the first sleeve 6 and the outer sleeve 7 in a liquid-tight state.

Figure 7:
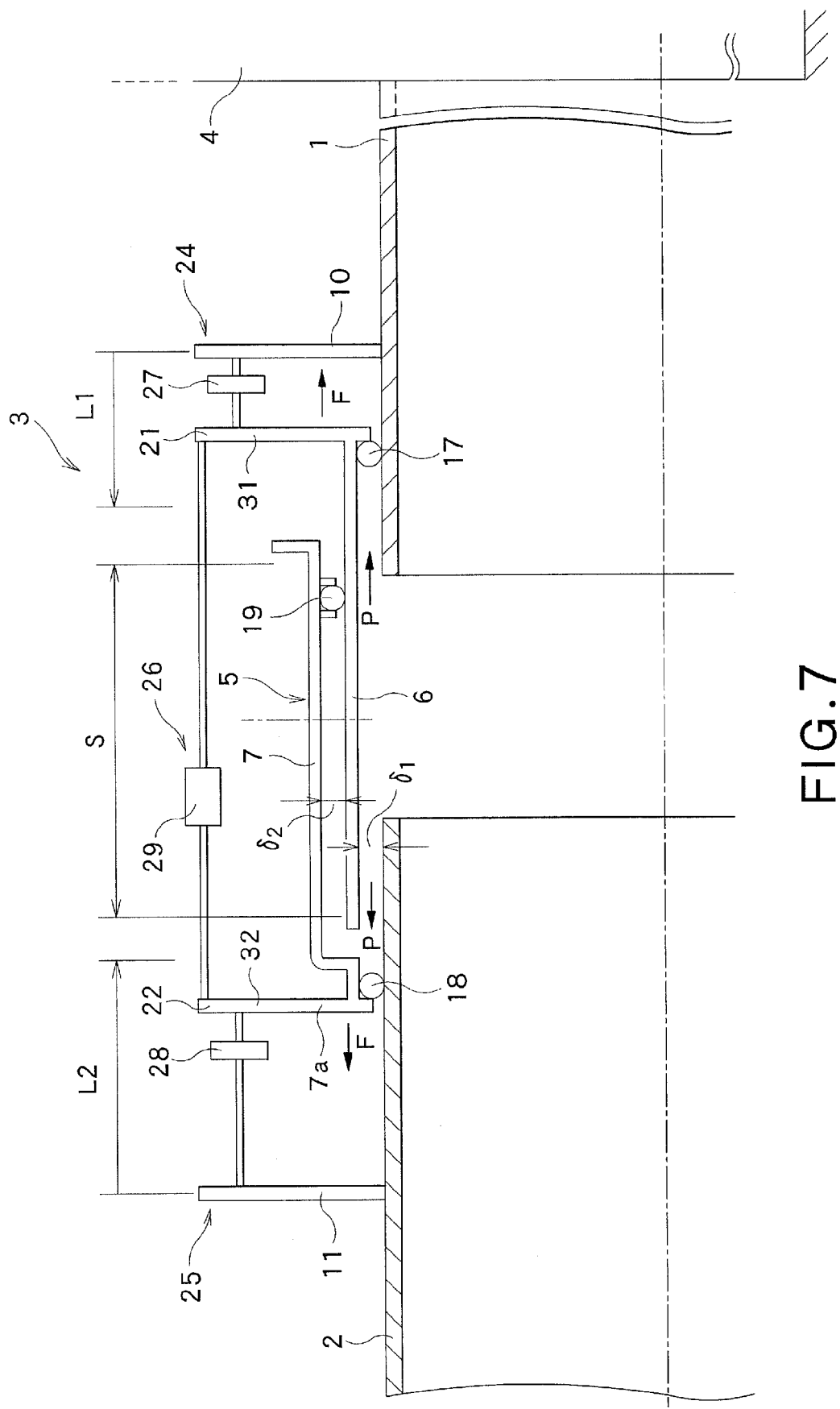
FIG. 7 is a schematic view showing a fourth embodiment of the present invention.

In FIG. 7, the first fixed member 31 is on the first reference holder 21, and the second fixed member 32 is on the second reference holder 22.

When a high external force F is generated by an earthquake or such, it is possible that the first sleeve 6 and the outer sleeve 7 move axially and are separate axially greatly from each other in addition to the increase of the distance between the first reference member 10 and the first reference holder 21 to the predetermined first limit length L1 and the increase of the distance between the second reference member 11 and the second reference holder 22 to the predetermined second limit length L2. It is possible that the first sleeve 6 and the outer sleeve 7 move axially relative to each other in preference to the axial movement of the first pipe 1 and the first sleeve 6 relative to each other and the axial movement of the second pipe 2 and the outer sleeve relative to each other depending on the physiographic condition and such of the site where the pipeline is laid. The maintenance of the liquid-tight sealing of the gap between the first sleeve 6 and the outer sleeve 7 by the third sealing member 19 can be ensured by limiting the axial movement of the first sleeve 6 and the outer sleeve 7 relative to each other by the third length limiter 26.

Figure 8:
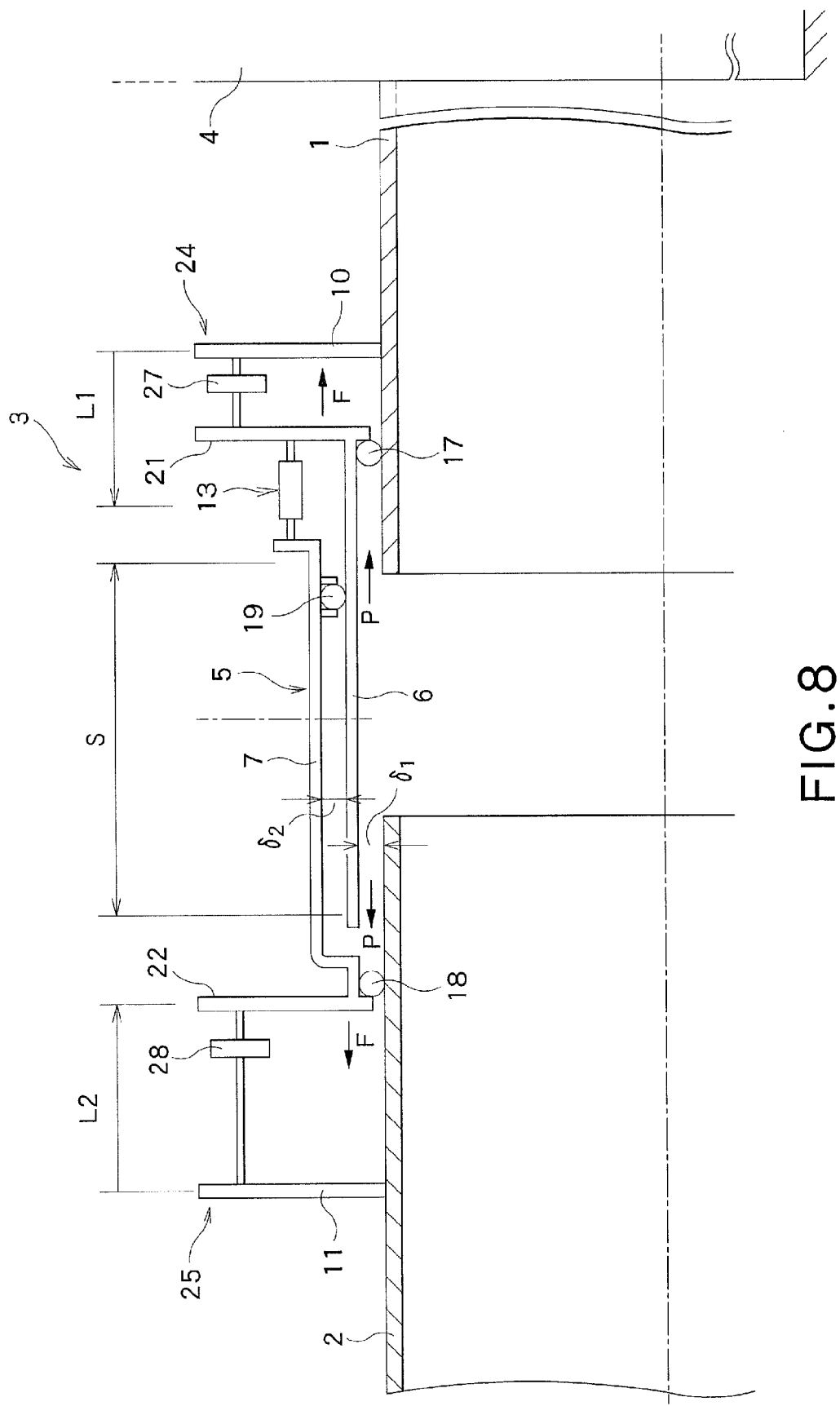
FIG. 8 is a schematic view showing a fifth embodiment of the present invention.

A flexible expansion joint 3 in a fifth embodiment of the present invention will be described with reference to FIG. 8. The fifth embodiment is formed by adding a brake 13 to the first embodiment shown in FIG. 4.

As mentioned above, an external force F acts on the first sleeve 6 so as to drive the first sleeve 6 in a direction opposite a direction in which the end of a first pipe 1 faces, and an external force F acts on the outer sleeve 7 so as to drive the outer sleeve 7 in a direction opposite a direction in which the end of a second pipe 2 faces.

The function of the brake 13 is to restrict the axial movement of the first sleeve 6 and the outer sleeve 7 relative to each other. While the external force F is below a predetermined threshold Fo, the brake 13 maintains the outer sleeve 7 in a stationary state. If the external force F exceeds the predetermined threshold Fo, the brake 13 nullifies the stationary state of the external sleeve 7 and permits the outer sleeve 7 to move relative to the first sleeve 6.

The threshold Fo is an empirically supposed known value. When the threshold Fo is a comparatively high, it is possible to make the first length limiter 24 and the second length limiter 25 function preferentially and to restrain the first sleeve 6 and the outer sleeve 7 from easily start axially moving relative to each other before the first length limiter 24 and the second length limiter 25 start functioning. Consequently, an allowable axial distance L1+L2 can be surely secured and an increase in the distance between the first sleeve 6 and the outer sleeve 7 can be added.

A flexible expansion joint 3 in a sixth embodiment of the present invention will be described with reference to FIGS. 9 to 12. The sixth embodiment employs concrete examples of the first length limiter 24 and the second length limiter 25 of the first embodiment described above with reference to FIG. 4, and a concrete example of the brake 13 of the fifth embodiment described above with reference to FIG. 8.

Figure 9:
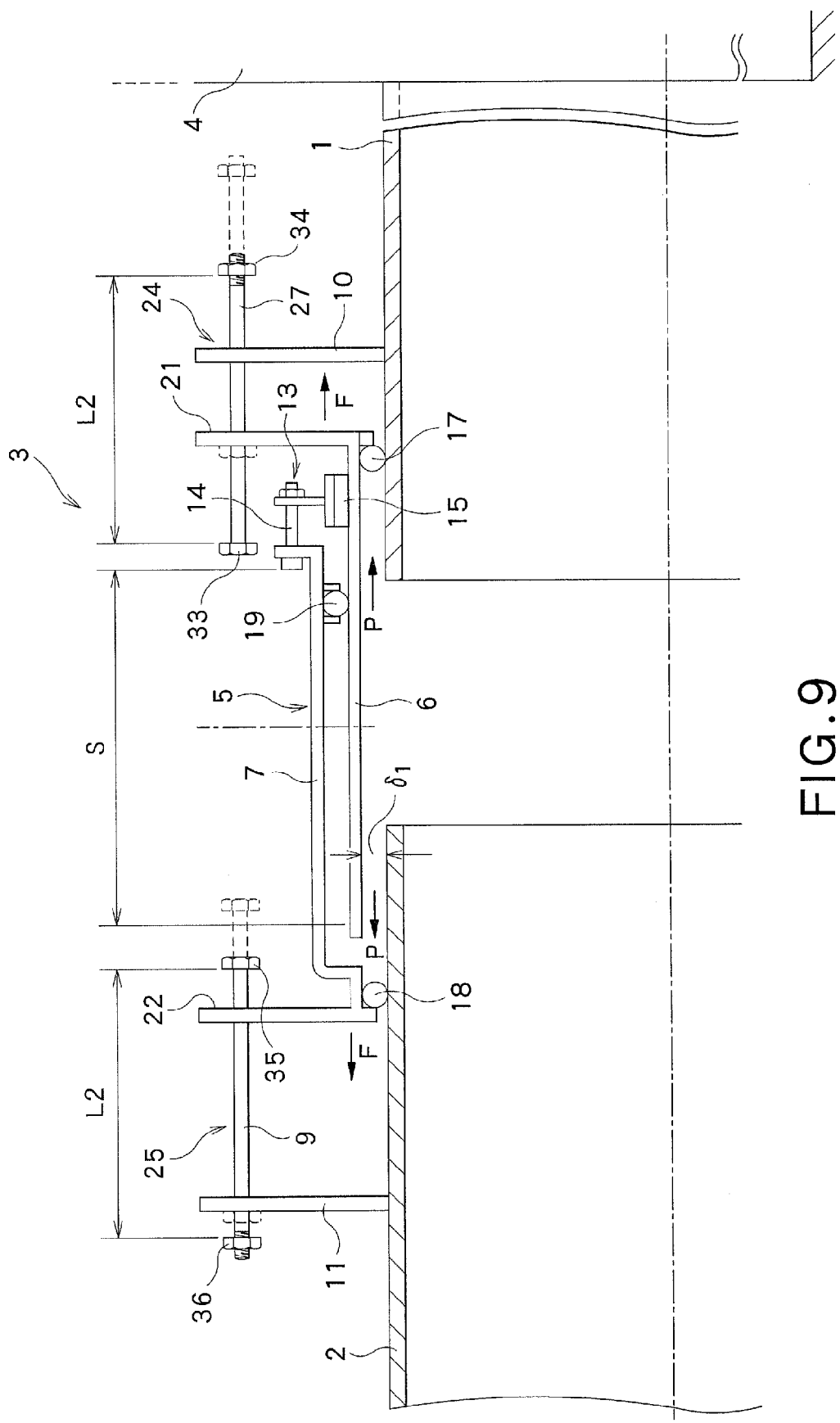
FIG. 9 is a schematic view showing a sixth embodiment of the present invention.

Referring to FIG. 9, a first stopper 27 of a first length limiter 24 has a first bolt 33 extended between a first reference member 10 and a first reference holder 21, and a first nut 34 put on the first bolt 33. The length of the first bolt 33 is determined such that the distance between the first reference member 10 and the first reference holder 21 is equal to a predetermined first limit length L1 when the head of the first bolt 33 is in contact with the first reference member 10 or the first reference holder 21.

Similarly, a second stopper 28 of a second length limiter 25 has a second bolt 35 extended between a second reference member 11 and a second reference holder 22, and a second nut 35 put on the second bolt 35. The length of the second bolt 35 is determined such that the distance between the second reference member 11 and the second reference holder 22 is equal to a predetermined second limit length L2 when the head of the second bolt 35 is in contact with the second reference member 11 or the second reference holder 22.

The brake 13 for restricting the axial movement of the first sleeve 6 and the outer sleeve 7 relative to each other will be described. The brake 13 has an arm 14 extending from a position near one end of the outer sleeve 7, and a friction member 15 held by the arm 14. The friction member 15 is made of rubber. The lower surface of the friction member 15 is pressed against the outside surface of the first sleeve 6 by the arm 14. The area of the lower surface of the friction member 15 and the quality of the rubber forming the friction member 15 are selectively determined such that the friction member 15 produces a friction which opposes the axial movement of the first sleeve 6 and the outer sleeve 7 relative to each other and the friction is equal to a predetermined threshold Fo. While an external force F is below the predetermined threshold Fo equal to the friction, the friction member 15 moves together with the first sleeve 6 to maintain the initial overlapping state of the first sleeve 6 and the outer sleeve 7. When the external force F exceeds the predetermined threshold Fo, the friction member 15 permits the axial movement of the outer sleeve 7 relative to the first sleeve 6.

It is conceivable that a sufficient friction cannot be produced only by the friction member 15 when the area of the lower surface of the friction member 15 is small. In such a case, it is possible to provide one of a first sealing member 16, a second sealing member 17 and a third sealing member 18 with a high frictional property to use the second sealing member 17 and the third sealing member having the frictional property also as a supplementary brake which provides an additional braking effect in addition to the braking effect of the brake 13.

Whether the braking action is effective or ineffective is dependent on whether the external force F is lower or higher than the predetermined threshold Fo. Thus, whether the braking action is effective or ineffective is decided digitally with respect to the predetermined threshold Fo. The effectiveness of the braking action can be smoothly changed if a threshold range is used instead of the predetermined threshold Fo.

Figure 10:
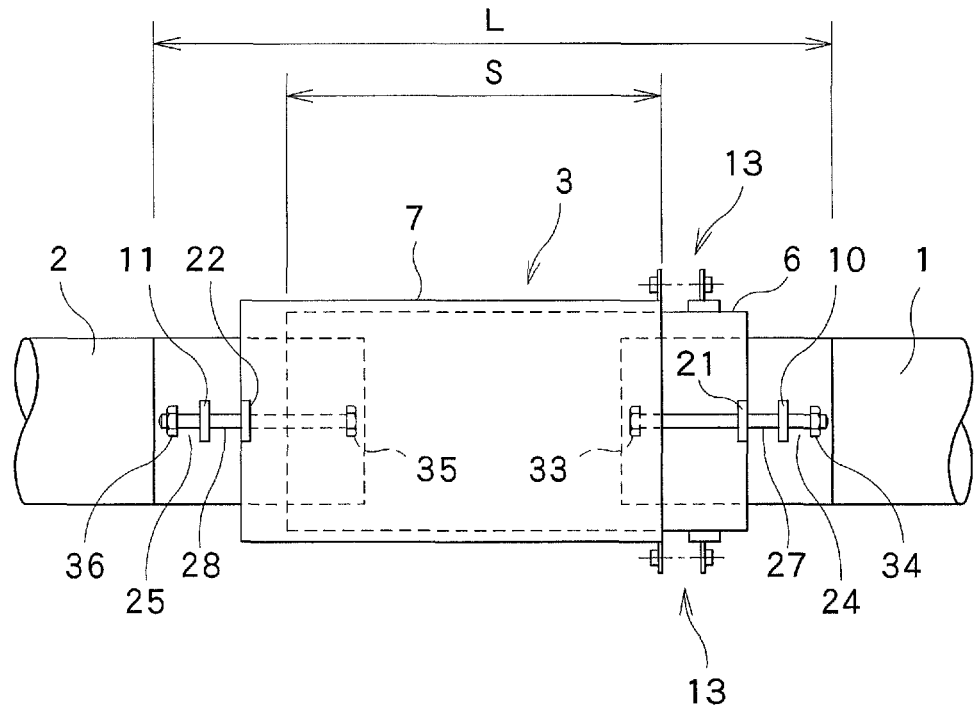
FIG. 10 is a view showing the sixth embodiment of the present invention, in which distance between pipes is not changed and the pipes are coaxial.

Motions of the flexible expansion joint 3 will be described with reference to FIGS. 10 to 12. FIG. 10 shows an initial state where the first pipe 1 and the second pipe 2 are connected coaxially by the flexible expansion joint 3. The flexible expansion joint 3 has an overall length L. The overlap length of the first sleeve 6 and the outer sleeve 7 is S.

When the distance between the first pipe 1 and the second pipe 2 increases axially and, for example, the first stopper 27 operates, the first pipe 1 is axially movable by a distance not longer a first limit length L1 until the head of the first bolt 33 of the first stopper 27 comes into contact with the reference holder 21 and the first nut 34 comes into contact with the first reference member 10. When the distance between the first pipe 1 and the second pipe 2 increases axially still further, the second pipe 2 is axially movable by a distance not longer than a second limit length L2 until the head of the second bolt 35 of the second stopper 28 comes into contact with the reference holder 22 and the second nut 36 comes into contact with the second reference member 11. Thus, an increase L1+L2 in the distance between the first pipe 1 and the second pipe 2 is absorbed and such an increase in the distance between the first pipe 1 and the second pipe 2 is permitted.

Figure 11:
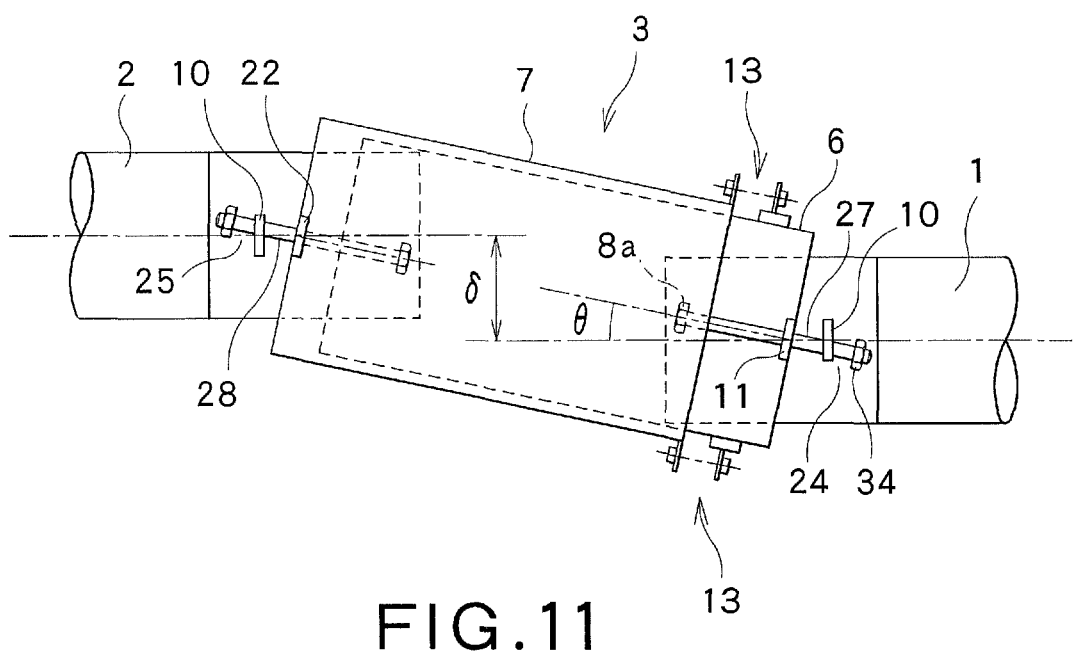
FIG. 11 is a view showing the sixth embodiment of the present invention, in which pipes are not coaxial.

FIG. 11 shows a state where the axial distance between the first pipe 1 and the second pipe 2 is changed slightly, the respective axes of the first pipe 1 and the second pipe 2 are separated from each other by a coaxiality deviation $\delta$ and the axis of the flexible expansion joint 3 is inclined at an angle $\theta 1$ to an axial direction. A change in the distance between the pipes 1 and 2 caused by the separation the respective axes of the pipes 1 and 2 from each other by the coaxiality deviation $\delta$ is absorbed by the first length limiter 24 and the second length limiter 25.

Automatic deformation of the first sealing member 17 and the second sealing member 18 allows the inclination of the axis of the flexible expansion joint 3 at the angle $\theta 1$ to the axial direction. Lip sealing members may be used as the first sealing member 17 and the second sealing member 18 to maintain automatic sealing by the automatic deformation of the first sealing member 17 and the second sealing member 18.

Figure 12:
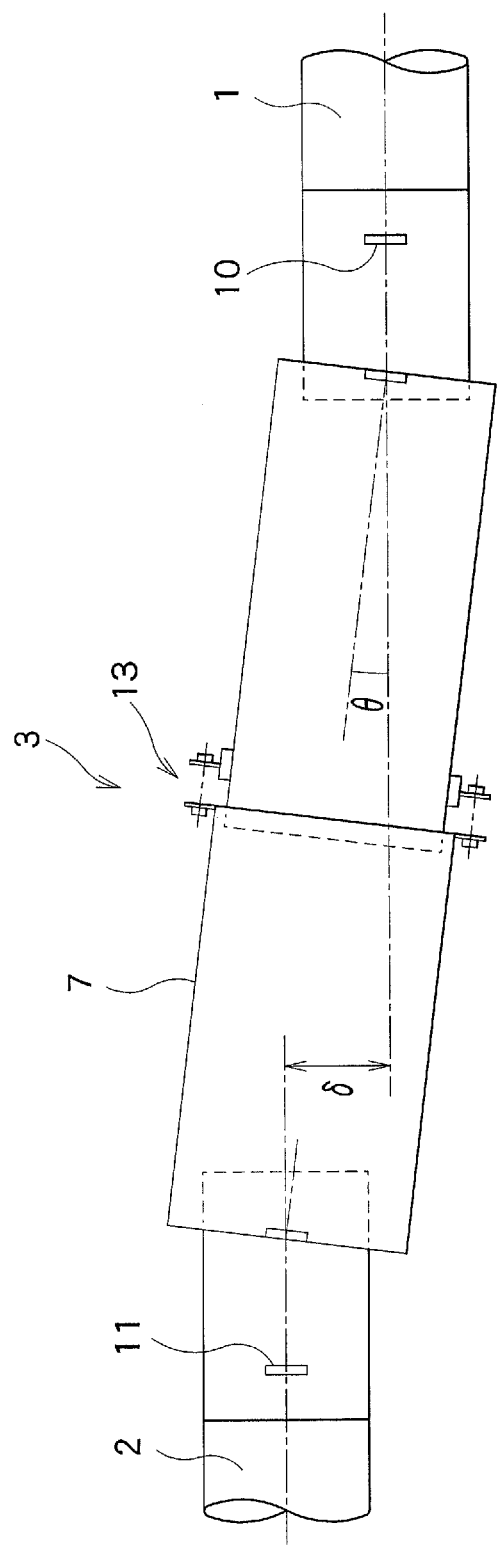
FIG. 12 is a view showing the sixth embodiment of the present invention, in which the distance between pipes is increased and the pipes are not coaxial.

FIG. 12 shows a state where the axial distance between the first pipe 1 and the second pipe 2 is increased to a maximum distance permitted by the flexible expansion joint 3 and the respective axes of the pipes 1 and 2 are separated from each other by a coaxiality deviation $\delta$.

The increase in the axial distance between the first pipe 1 and the second pipe 2 is very large, a high external force F exceeding the threshold Fo is acting on the first sleeve 6, a distance by which the outer sleeve 7 is moved relative to the first sleeve 6 is a limit distance at a distance below which the third sealing member 29 can maintain liquid-tight sealing, and the flexible expansion joint 3 is lengthened by a length substantially equal to the length L1+L2+S.

A case in which the distance between the first pipe 1 and the second pipe 2 is changed and the respective axes of the first pipe 1 and the second pipe 2 are separated from each other is described above. A case in which the first pipe 1 and the second pipe 2 are twisted relative to each other can be coped with by the cooperative actions of the first sealing member 17, the second sealing member 18, the third sealing member 19, the first length limiter 24 and the second length limiter 25.

As mentioned in connection with the description of the first embodiment, a first gap $\delta 1$ between the inside surface of the first sleeve 6 and the outside surface of an end part of the first pipe 1, a second gap $\delta 2$ between the outside surface of the first sleeve 6 and the inside surface of the outer sleeve 7, and the respective thicknesses of the first sealing member 17, the second sealing member 18 and the third sealing member 19 are determined in consideration of a possible coaxiality deviation $\delta$ and a possible angle $\theta$.

A flexible expansion joint 3 in a seventh embodiment of the present invention will be described with reference to FIG. 13.

The flexible expansion joint 3 in the seventh embodiment is formed by adding a brake 13 and an outer brake 13a to the flexible expansion joint 3 in the second embodiment described with reference to FIG. 5.

Composition of the brake 13 and the outer brake 13a are the same as that of the brake 13 of the sixth embodiment. A first length limiter 24 and a second length limiter 25 are the same as those of the sixth embodiment. Thus, the seventh embodiment can be considered as an advanced modification of the sixth embodiment.

In the sixth embodiment shown in FIG. 9, the outer sleeve 7 is a single sleeve overlapping the first sleeve 6. As shown in FIG. 13, an outer sleeve 7 of the seventh embodiment is a composite sleeve including plural nested sleeves, such as an outer component sleeve 7b and an inner component sleeve 7a nested in the outer component sleeve 7b.

A brake 13 for limiting the movement of the inner component sleeve 7a relative to the first sleeve 6 is disposed between the first sleeve 6 and the inner component sleeve 7a. The brake 13 includes an arm 14 extending from a position near one end of the inner component sleeve 7a, and a friction member 15 held by the arm 14. The lower surface of the friction member 15 is pressed against the outside surface of the first sleeve 6.

The outer brake 13a is disposed between the inner component sleeve 7a and the outer component sleeve 7a to restrain the axial movement of the outer component sleeve 7b relative to the inner component sleeve 7a. The composition of the outer brake 13a is similar to that of the brake 13.

Different thresholds Fo can be determined by providing the outer brake 13a and the brake 13 with different friction areas and different surface roughness, respectively. Fog example, the axial movement of the inner component sleeve 7a and the outer component sleeve 7b relative to each other is allowed to start preferentially to the axial movement of the first sleeve 6 and the inner component sleeve 7a relative to each other when the threshold Fo determined by the outer brake 13a is lower than the threshold Fo determined by the brake 13, and vice versa.

Actions of the first length limiter 24 and the second length limiter 25 can be preferentially started by setting high thresholds Fo by the outer brake 13a and the brake 13.

Figure 15:
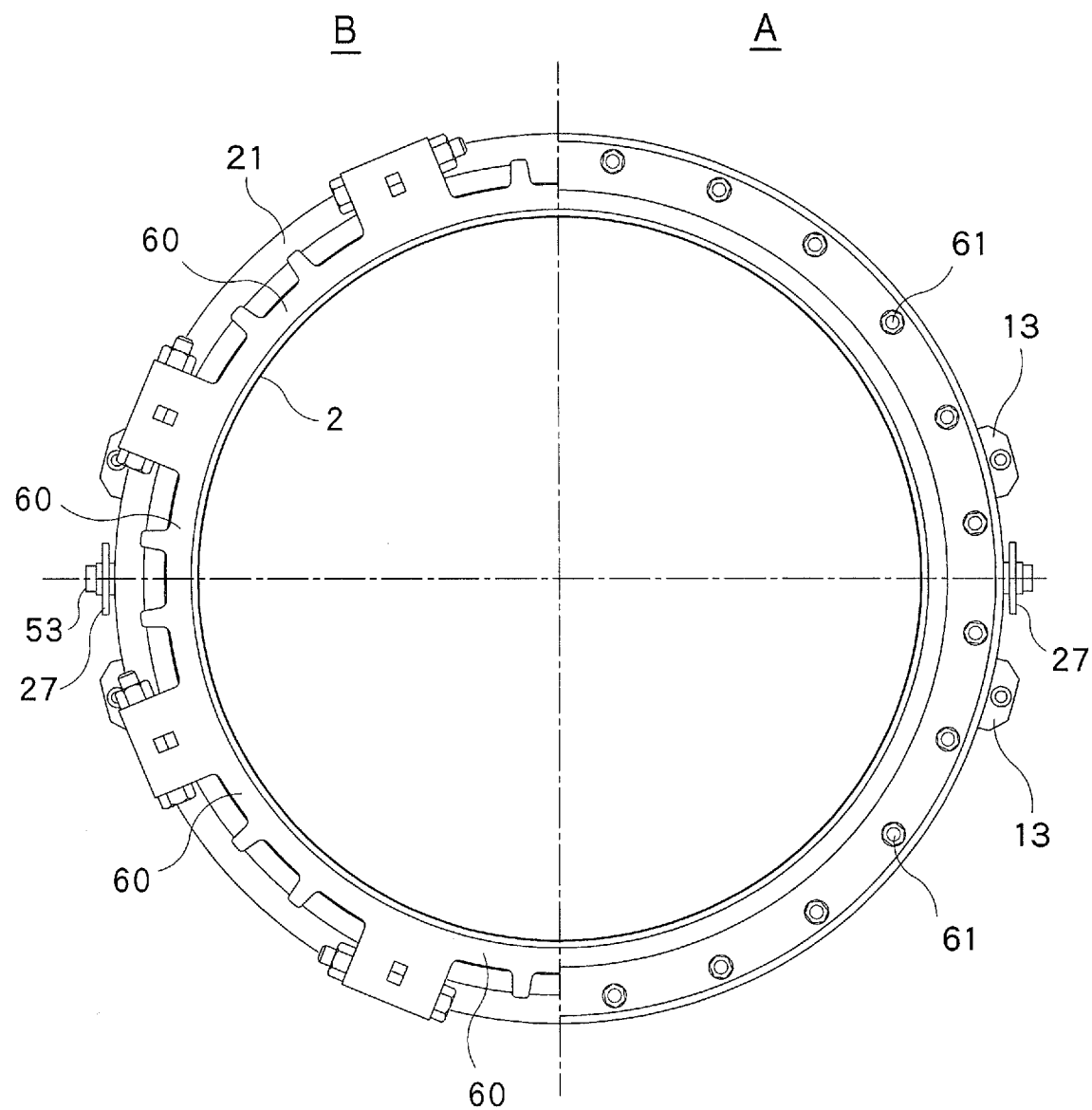
FIG. 15 is a schematic end view showing sections of the eighth embodiment of the present invention taken from directions A and B in FIG. 14.

A flexible expansion joint 3 in an eighth embodiment of the present invention will be described with reference to FIGS. 14 to 21. In FIG. 14, an upper part above a chain line is a sectional view of the flexible expansion joint 3 and a part below the chain line is a plan view of the flexible expansion joint 3. FIG. 15 shows an end view taken from the direction A and an end view taken from the direction B. FIG. 20 show an upper part of the flexible expansion joint 3.

A first length limiter 24, a second length limiter 25 and brakes 13 of the eighth embodiment are different from those of the sixth embodiment.

In the eighth embodiment, each of first stoppers 27 included in the first length limiter 24 is provided with a first plate 51 extended between a first reference member 10 and a first reference holder 21. The first plate 51 is provided with a first axial slot 52. The first plate 51 is fastened to the first reference member 10 with a screw 53. The first stopper 27 is provided with a first guide member 54, such as a screw, for guiding the first plate 51 along the first axial slot 52. The first plate 51 is guided for axial movement by the first guide member 54 fitted in the first axial slot 52. When the first guide member 54 is at the left end, as viewed in FIG. 14, of the first axial slot 52, the distance between the first reference member 10 and the first reference older 21 is equal to a predetermined first limit length L1.

Similarly, each of second stoppers 28 included in the second length limiter 25 is provided with a second plate 55 extended between a second reference member 11 and a second reference holder 22. The second plate 55 is provided with a second axial slot 56. The second plate 55 is fastened to the second reference member 11 with a screw 57. Each of the second stoppers 28 is provided with a second guide member 58, such as a screw, for guiding the second plate 55 along the second axial slot 56. The second plate 55 is guided for axial movement by the second guide member 58 fitted in the second axial slot 56. When the second guide member 58 is at the right end, as viewed in FIG. 14, of the second axial slot 56, the distance between the second reference member 11 and the second reference holder 22 is equal to a predetermined limit length L2.

The first stoppers 27 and the second stoppers 28 are arranged at equal circumferential intervals.

Figure 21:
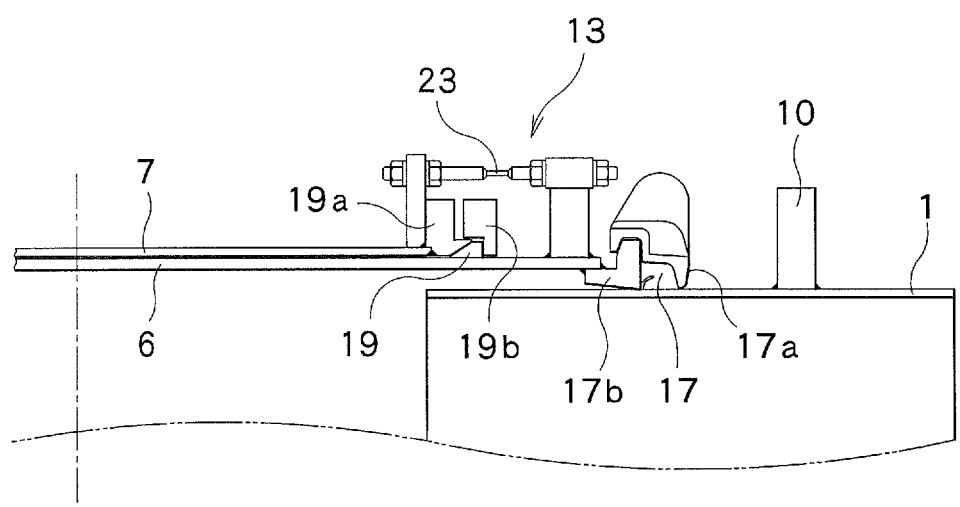
FIG. 21 is a view showing the eighth embodiment of the present invention, in which a brake is shown in an enlarged view.

The brakes 13 of the eighth embodiment will be described. The brakes 13 control the movement of the outer sleeve 7 relative to the first sleeve 6. The brakes 13 are arranged at equal circumferential intervals. As shown in FIG. 21, each brake 13 includes a fuse bar 23 extended between the outer sleeve 7 and the first sleeve 6. The fuse bar 23 remains extended between the outer sleeve 7 and the first sleeve 6 while an external force F is below a predetermined threshold Fo. When the external force F exceeds the predetermined threshold Fo, the fuse bar 23 breaks under the external force F.

Arrangement of a first sealing member 17, a second sealing member 18 and a third sealing member included in the eighth embodiment will be described.

The first sealing member 17 is disposed contiguously with the right end of the first sleeve 6 to seal the gap between the inside surface of the first sleeve 6 and the outside surface of the first pipe 1 in a liquid-tight state. The first sealing member 17 is retained by a retaining ring 17a having an L-shaped cross section and a retaining ring 17b having a stepped cross section.

The second sealing member 18 is disposed contiguously with the left end of the outer sleeve 7 to seal the gap between the inside surface of the outer sleeve 7 and the outside surface of the second pipe 2 in a liquid-tight state. The second sealing member 18 is retained by a retaining ring 18b having a U-shaped cross section and a retaining ring 18a having a stepped cross section.

The first sealing member 17 and the second sealing member 18 are automatic sealing members capable of deforming under internal or external pressures. As shown in FIGS. 14 and 20, the first sealing member 17 and the second sealing member 18 are lip sealing members each formed by removing an inner part of a ring.

Figure 19:
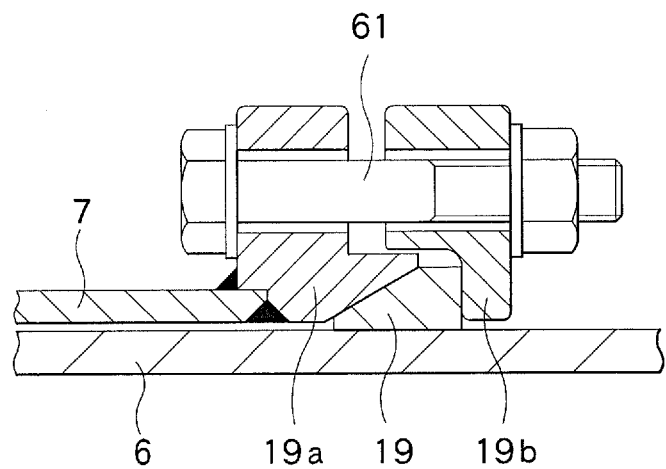
FIG. 19 is a view showing the eighth embodiment of the present invention, in which the other end part of the outer sleeve is shown in an enlarged view.
Figure 20:
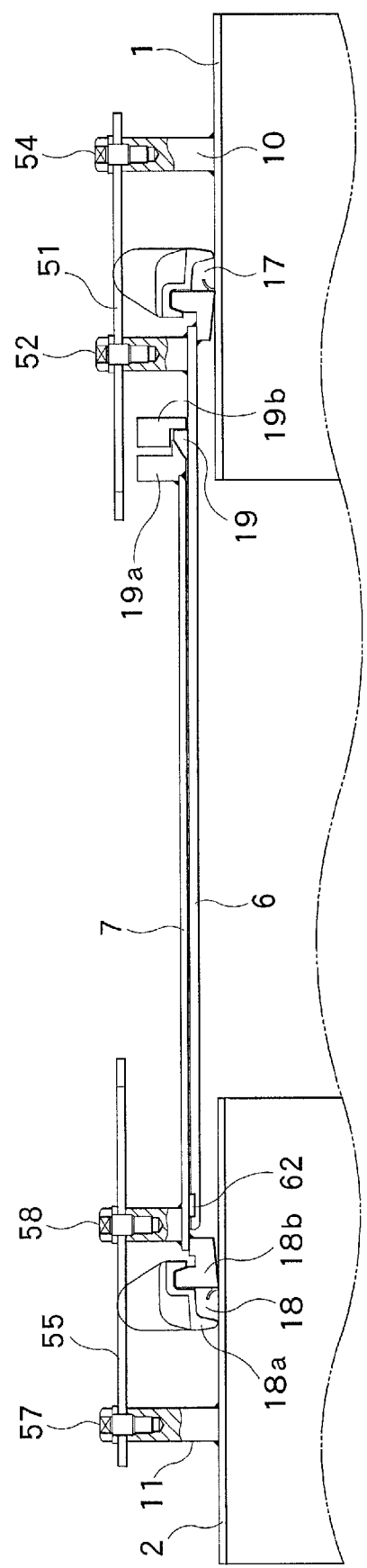
FIG. 20 is a view showing the eighth embodiment of the present invention, in which the surface of the flexible expansion joint is shown in a sectional view.

As shown in FIG. 19 and other drawings, the third sealing member 19 is retained firmly by a retaining ring 19a having an L-shaped cross section and a retaining ring 19b having an L-shaped cross section disposed axially opposite to each other. The retaining rings 19a and 19b are held in place by bolt-nut fasteners 61.

The third sealing member held between the retaining rings 19a and 19b seals the gap between the outside surface of the first sleeve 6 and the inside surface of the outer sleeve 7 in a liquid-tight state.

The third sealing member 19 has, in addition to the liquid-sealing function mentioned above, a control function to restrain the outer sleeve from easily moving relative to the first sleeve 6. The third sealing member 19 can work as a supplementary brake for assisting the effect of the brake 13; that is, the third sealing member 19 may have, in addition to a function to seal the gap between the outside surface of the first sleeve and the inside surface of the outer sleeve 7 in a liquid-tight state, a function of a supplementary brake to restrain the outer sleeve from easily moving relative to the first sleeve 6. Therefore, when the external force F is considered to include a fixed external force F1 and a variable component F2, the brake 13 and the third sealing member 19 can be designed such that the supplementary braking effect of the third sealing member 19 counterbalances the fixed external force F1 and the braking effect of the brake 13 counteracts the variable component F2. Then, a predetermined substantial threshold is lower than a threshold for a condition where the braking effect of the brake 13 counteracts the external force F=F1+F2, and hence the brake 13 may be small. Although the third sealing member 13 is regarded as a supplementary brake in the foregoing description, the first sealing member 17 or the second sealing member 18 may be made to function as a supplementary brake instead of the third sealing member 19.

Figure 18:
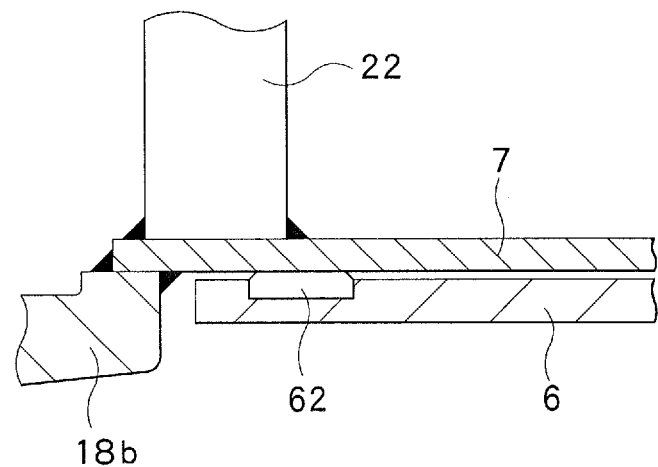
FIG. 18 is a view showing the eighth embodiment of the present invention, in which one end part of an outer sleeve is shown in an enlarged view.

As shown in FIG. 18 in an enlarged view, a protective ring 62 made of a hard rubber is fitted in an annular groove formed in a left end part of the first sleeve 6 and is in contact with the inside surface of the outer sleeve 7.

Although the protective ring 62 is not an essential member, the direction of the outer sleeve 7 relative to the first sleeve can be stabilized by the combined effect of the protective ring 62 and the third sealing member 19. When the protective ring 62 is used, the third sealing member 19 is not provided with a function to cope with the separation of the respective axes of the first pipe 1 and the second pipe 2 from each other.

Figure 16:
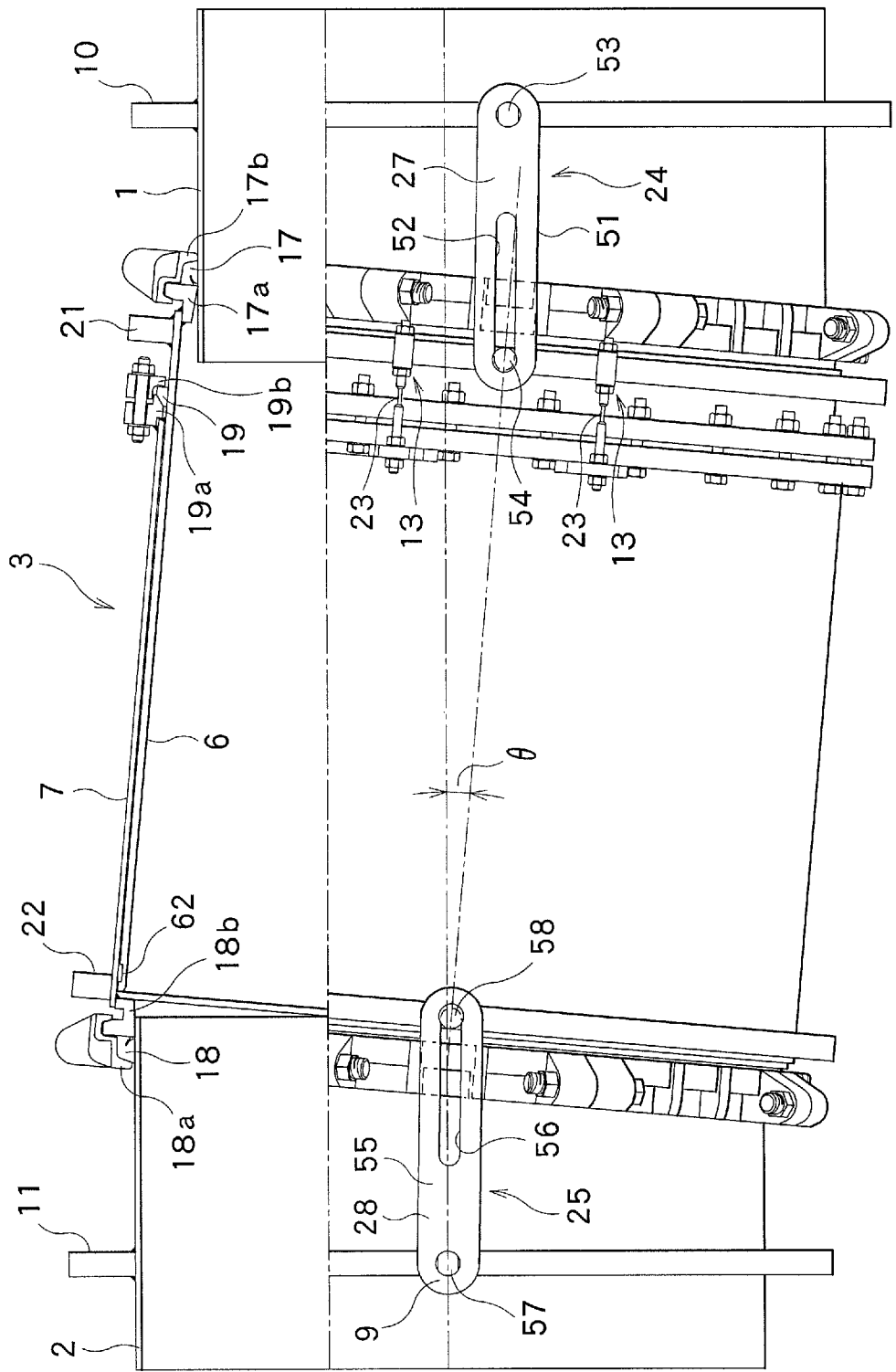
FIG. 16 is a view showing the eighth embodiment of the present invention, in which the pipes are not coaxial.

FIG. 16 shows a state where the flexible expansion joint 3 is allowed to lengthen by a length equal to L1+L2 by the action of the first length limiter 24 and the second length limiter 25. In FIG. 16, the distance between the first reference member 10 and the first reference holder 21 is equal to the predetermined first limit length L1, the distance between the second reference member 11 and the second reference holder 22 is equal to the predetermined limit length L2, the first guide member 54 is in contact with the left end of the first slot 52, and the second guide member 58 is in contact with the right end of the second axial slot 56.

In that state, the external force F is below the predetermined threshold Fo, the fuse bar 23 is not broken and the outer sleeve 7 and the first sleeve 6 are not moved relative to each other.

Figure 17:
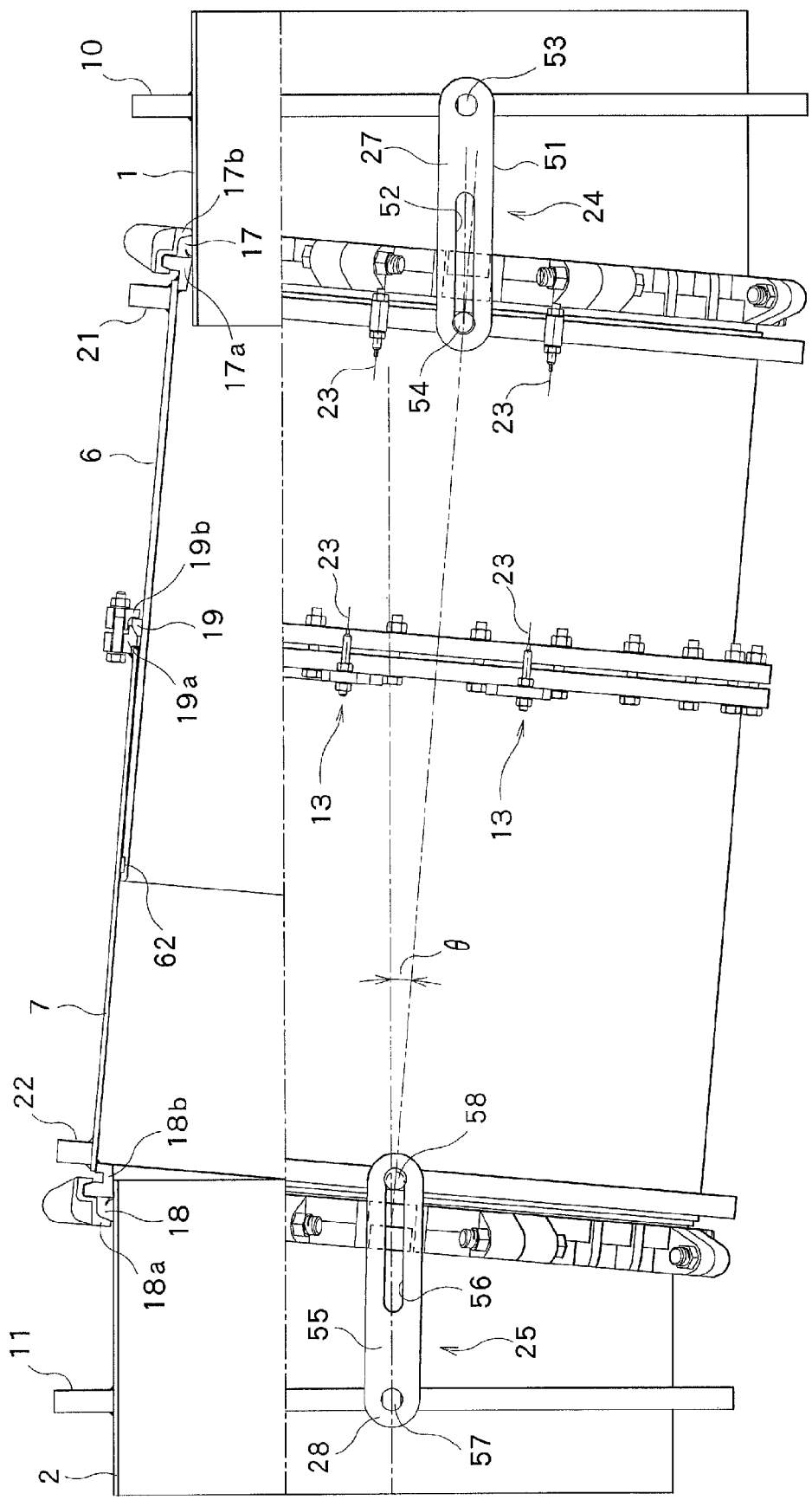
FIG. 17 is a view showing the eighth embodiment of the present invention, in which the pipes are not coaxial.

FIG. 17 shows a state where the external force F is higher than the predetermined threshold Fo and the fuse bar 23 is broken. The flexible expansion joint 3 can lengthen maintaining liquid-tight sealing by a length below the initial overlap length S of the outer sleeve 7 and the first sleeve 6 in addition to the length equal to L1+L2 owing to the agency of the first length limiter 24 and the second length limiter 25.

The brakes 13 and 13a each provided with the friction member 15, and the brake 13 provided with the fuse bar 23 are described by way of example in the foregoing description. A brake 13 to be used by the embodiment is not limited to those described above and may be of any other design, provided that the brake 13 is capable of controlling and limiting the axial movement of the outer sleeve 7 relative to the inner sleeve 6.

Figure 22:
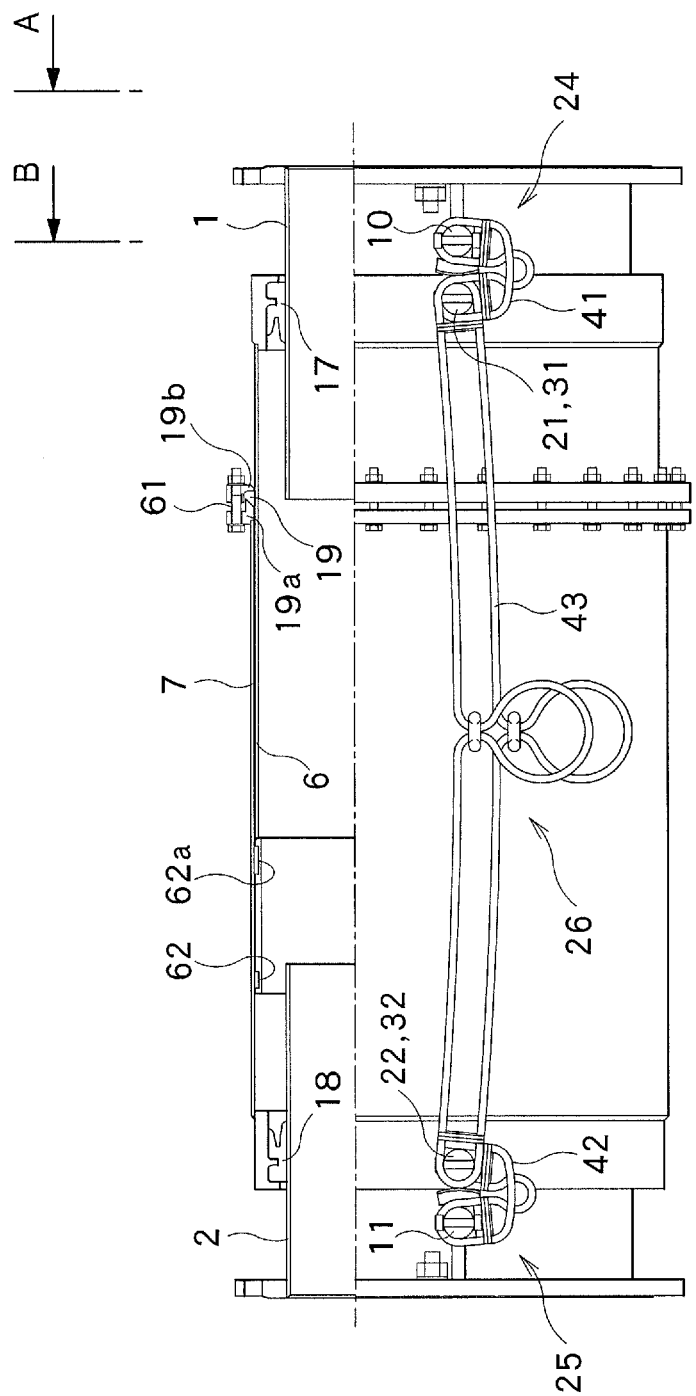
FIG. 22 is a view showing a ninth embodiment of the present invention, in which pipes are coaxial and the distance between the pipes is fixed.
Figure 23:
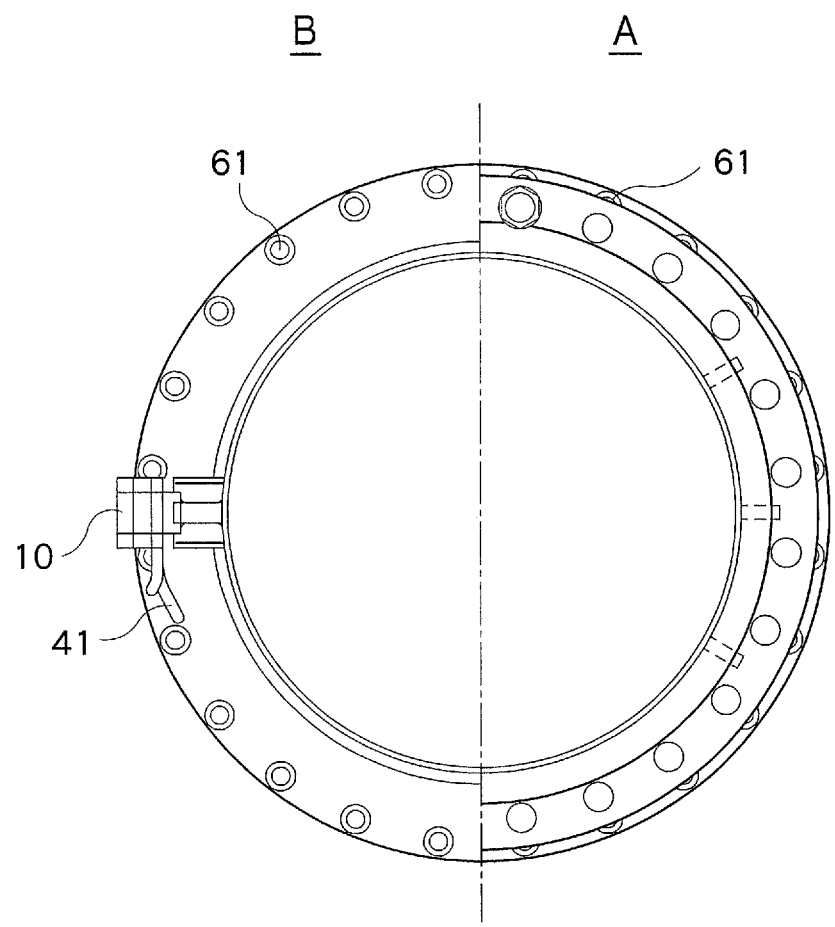
FIG. 23 is an end view showing sections of the ninth embodiment of the present invention taken from a direction A and an end view taken from a direction B in FIG. 22.

A flexible expansion joint 3 in a ninth embodiment of the present invention will be described with reference to FIGS. 22 to 26. FIG. 22 is a plan view of the flexible expansion joint 3 and FIG. 23 shows end views take from directions A and B, respectively, in FIG. 22.

The ninth embodiment is a concrete example of the fourth embodiment shown in FIG. 7.

In the ninth embodiment, a first fixed member 31 is put on a first reference holder 21, and the second fixed member 32 is put on a second reference holder 22.

As shown in FIG. 22 and other drawings, a first stopper 27 included in a first length limiter 24 is a first string 41 of a predetermined limit length L1, and a second stopper 28 included in a second length limiter 25 is a second string 42 of a predetermined limit length L2. The first string 41 is extended between a first reference member 10, and a first reference holder 21 serving also as a first fixed member 31. The second string 42 is extended between a second reference member 11, and a second reference holder 22 serving also as a second fixed member 32.

The ninth embodiment includes a third length limiter 26 that limits the axial movement of a first sleeve 6 and an outer sleeve 7. A third stopper 29 included in the third length limiter 26 is a third string 43 of a predetermined third limit length L3.

Figure 24:
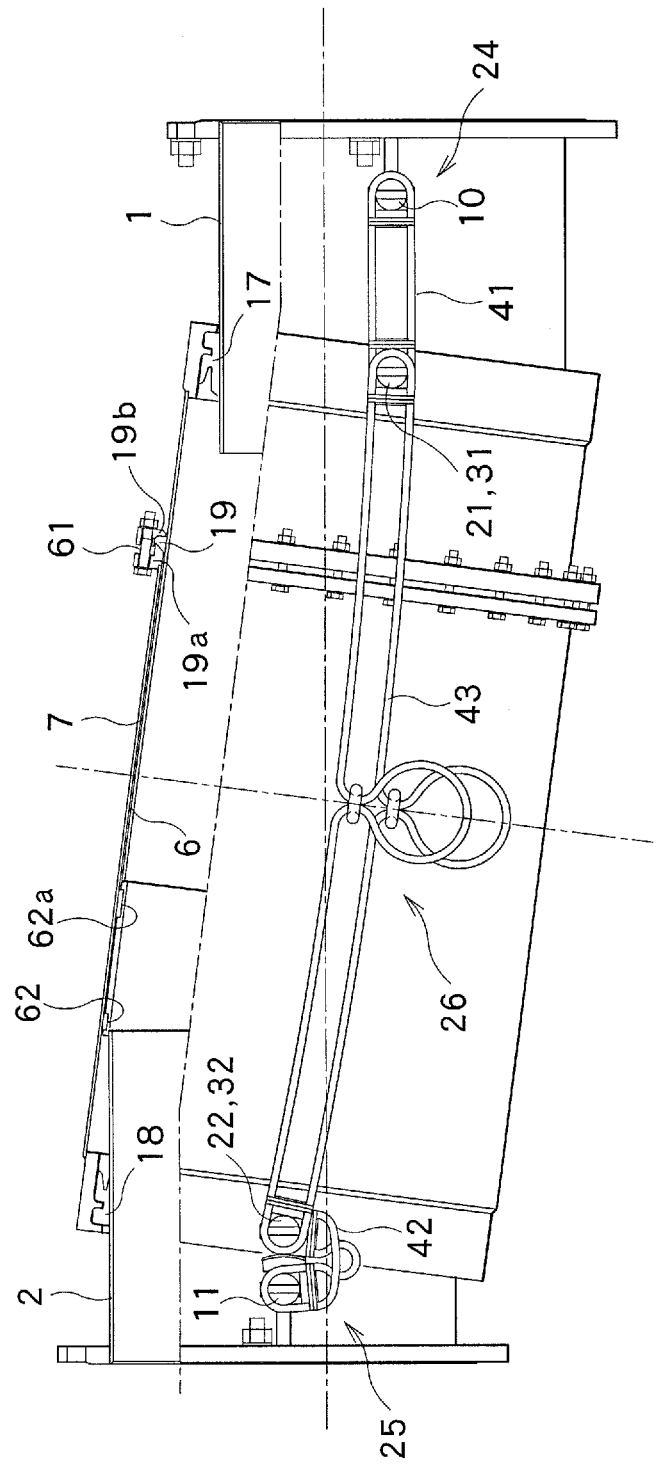
FIG. 24 is a view showing a ninth embodiment of the present invention, in which pipes are not coaxial.

FIG. 24 shows a state where the distance between a first pipe 1 and a second pipe 2 is caused to increase by an external force F causing the first length limiter 24 to act, and the first string 41, namely, the first stopper 27, is lengthened to the predetermined limit length L1.

Figure 25:
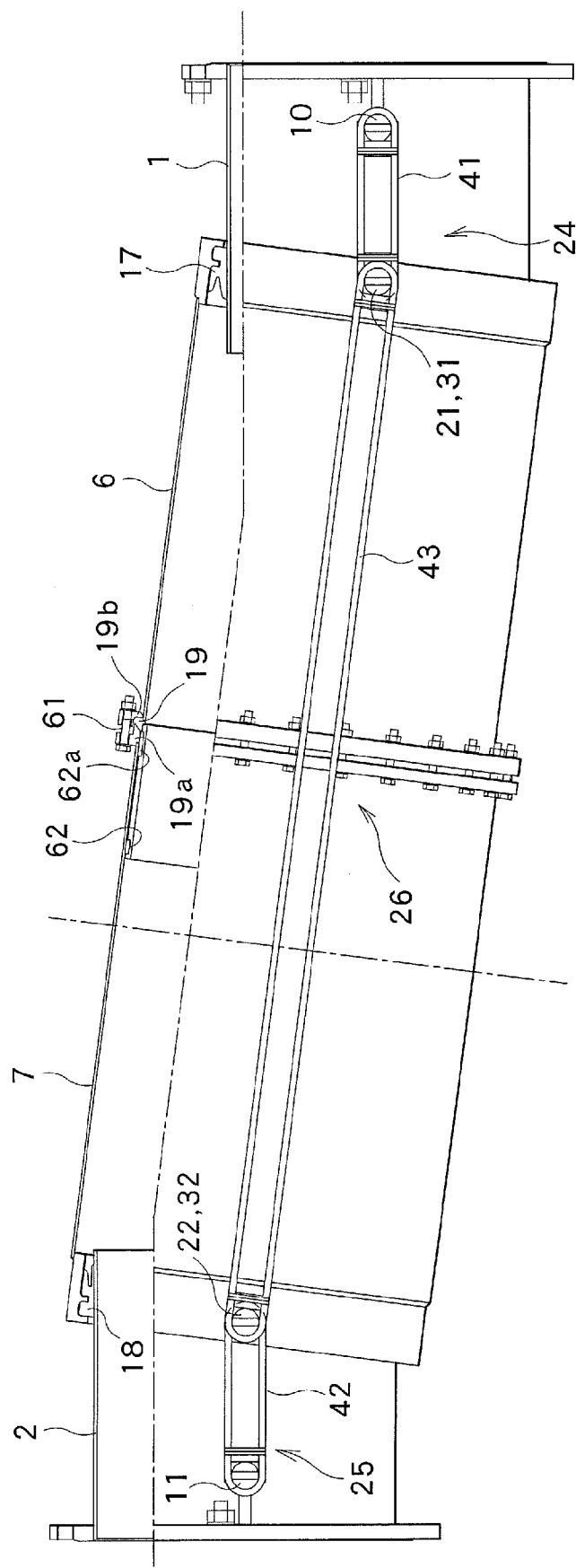
FIG. 25 is a view showing the ninth embodiment of the present invention, in which the distance between the pipes is increased and the pipes are not coaxial.
Figure 26:
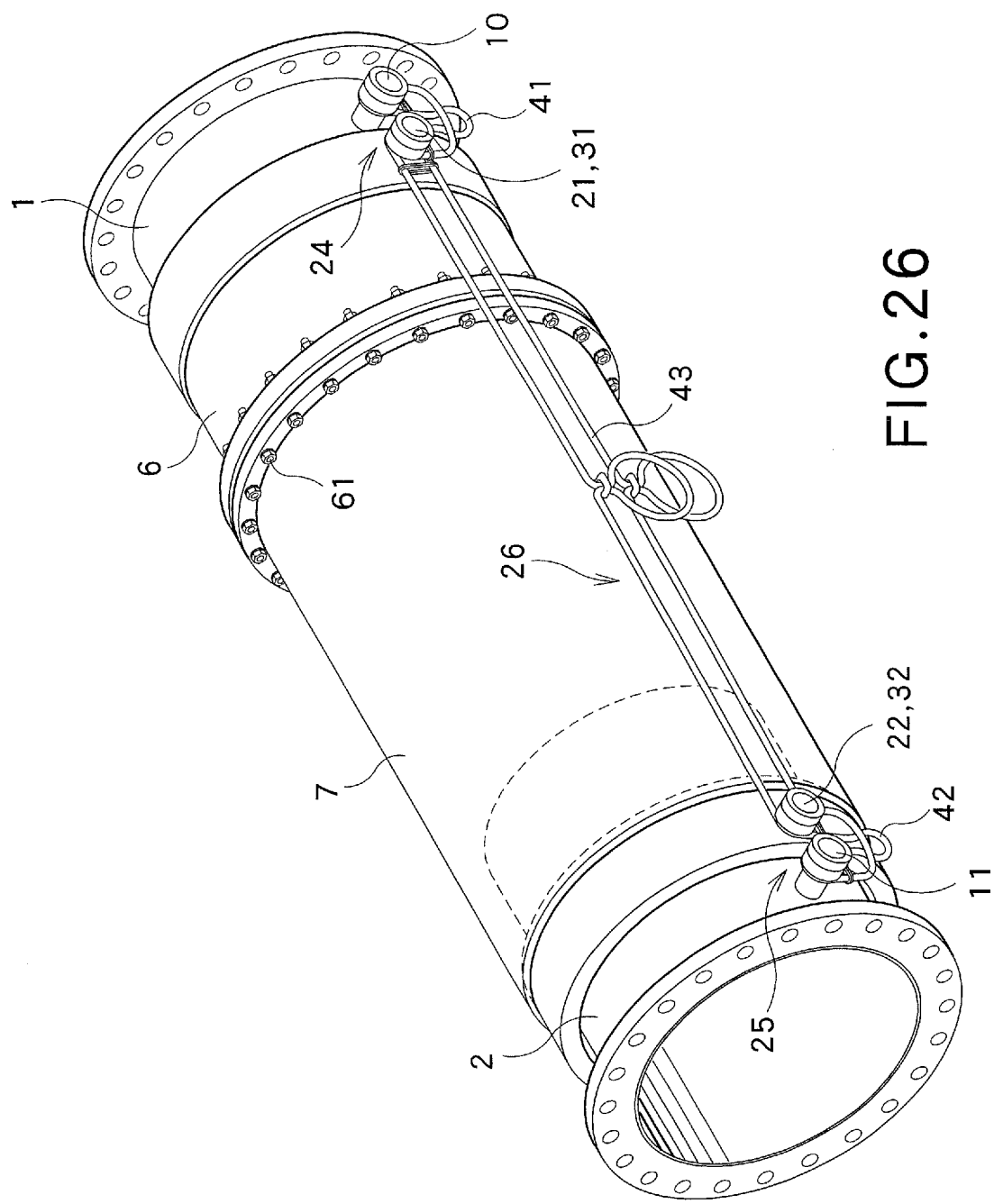
FIG. 26 is a perspective view of the ninth embodiment of the present invention.

FIG. 25 shows a state where the distance between the first pipe 1 and the second pipe 2 is caused to increase greatly by a high external force F higher than that in the case shown in FIG. 24, and the first pipe 1 and the second pipe 2 are not coaxial. The high external force caused the first length limiter 24, the second length limiter 25 and the third length limiter 26 to act, the first string 41, namely, the first stopper 27, is lengthened to the predetermined limit length L1, the second string 42, namely, the second stopper 28 is lengthened to the predetermined limit length L2, and the third string 43, namely, the third stopper 29, is lengthened to the predetermined third limit length L3. Consequently, the flexible expansion joint 3 is lengthened by a length equal to L1+L21+S and is extended in a length equal to L1+L2+2S.

A Flexible expansion joint 3 in a tenth embodiment of the present invention will be described with reference to FIGS. 27 to 33.

The tenth embodiment is a concrete example of the fourth embodiment shown in FIG. 7. A first length limiter 24, a second length limiter 25 and a third length limiter 26 are different from those of the ninth embodiment in design.

Figure 27:
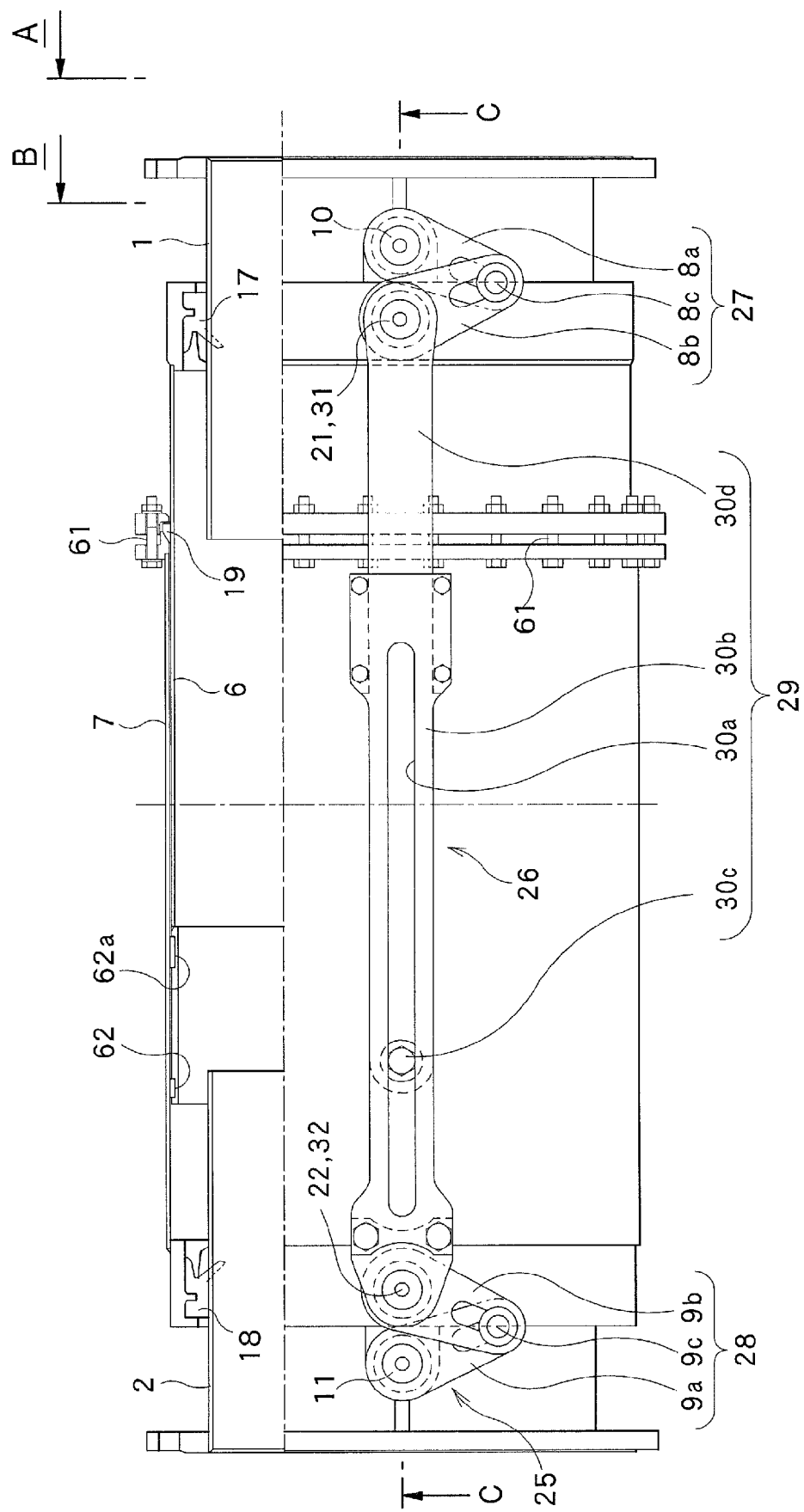
FIG. 27 is a view showing an tenth embodiment of the present invention installed in an initial position.
Figure 28:
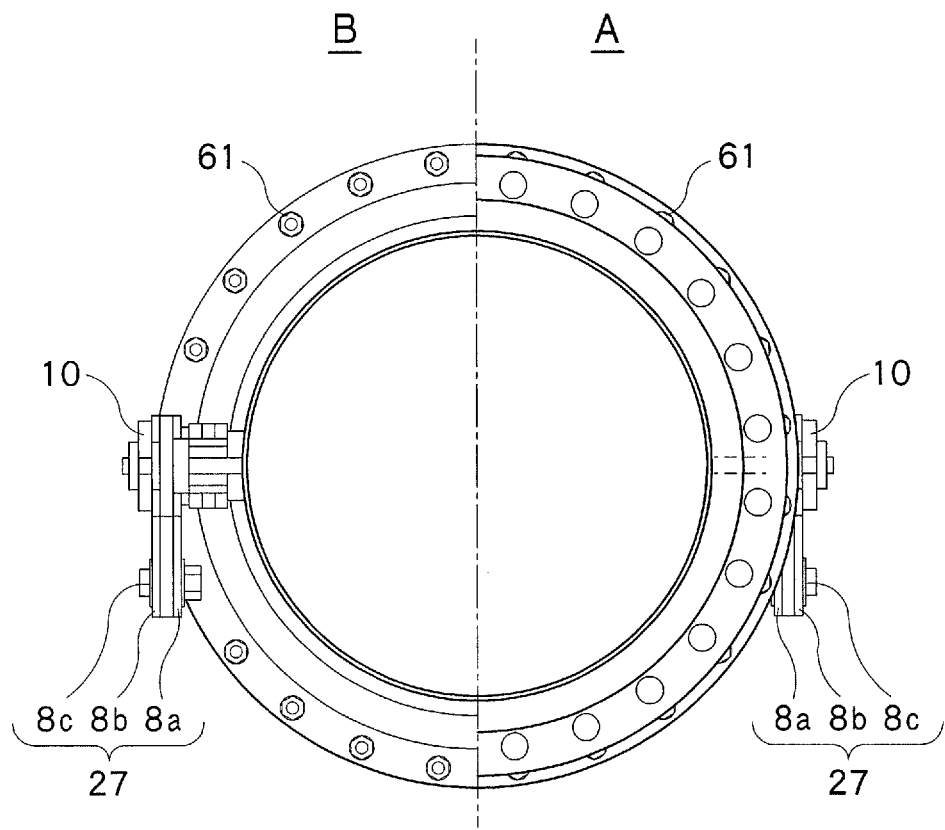
FIG. 28 is an end view taken from a direction A and an end view taken from a direction B in FIG. 27, showing sections of the tenth embodiment of the present invention.

As shown in FIG. 27 and other drawings, in the tenth embodiment, a first stopper 27 included in the first length limiter 24 includes a first turning member 8a having one end pivotally supported on a first reference member 10, a first bending member 8b having one end pivotally supported on a first reference holder 21, and a first pivot pin 8c pivotally connecting the respective other ends of the first turning member 8a and the first bending member 8b. When the first turning member 8a and the first bending member 8b extend straight, the distance between a first reference member 8 and the first reference holder 21 is equal to a predetermined first limit length L1.

A second stopper 28 included in the second length limiter 25 includes a second turning member 9a having one end pivotally supported on a second reference member 11, a second bending member 9b having one end pivotally supported on a second reference holder 22, and a second pivot pin 9c pivotally connecting the respective other ends of the second turning member 9a and the second bending member 9b. When the first turning member 8a and the first bending member 8b extend straight, the distance between a second reference member 11 and the second reference holder 22 is equal to a predetermined second limit length L2.

The third length limiter 26 will be described.

The third length limiter 26 includes a first fixed member 31, a second fixed member 32 and a third stopper 29. In the tenth embodiment, the first fixed member 31 is placed on the first fixed member 21, and the second fixed member 32 is placed on the second reference holder 22.

The third stopper 29 includes a slotted plate 30b formed in the shape of a flat bar, having one end attached to the fixed member 32 and provided with a third axial slot 30a, and a guide member 30d formed in the shape of a flat bar, having one end attached to the first fixed member 31 and provided with a screw-shaped guide part 30c fitted in the third axial slot 30a. The distance between the first fixed member 31 and the second fixed member 32 is equal to a predetermined third length L3 when the guide member 30d is in contact with one end of the third axial slot 30a.

Figure 29:
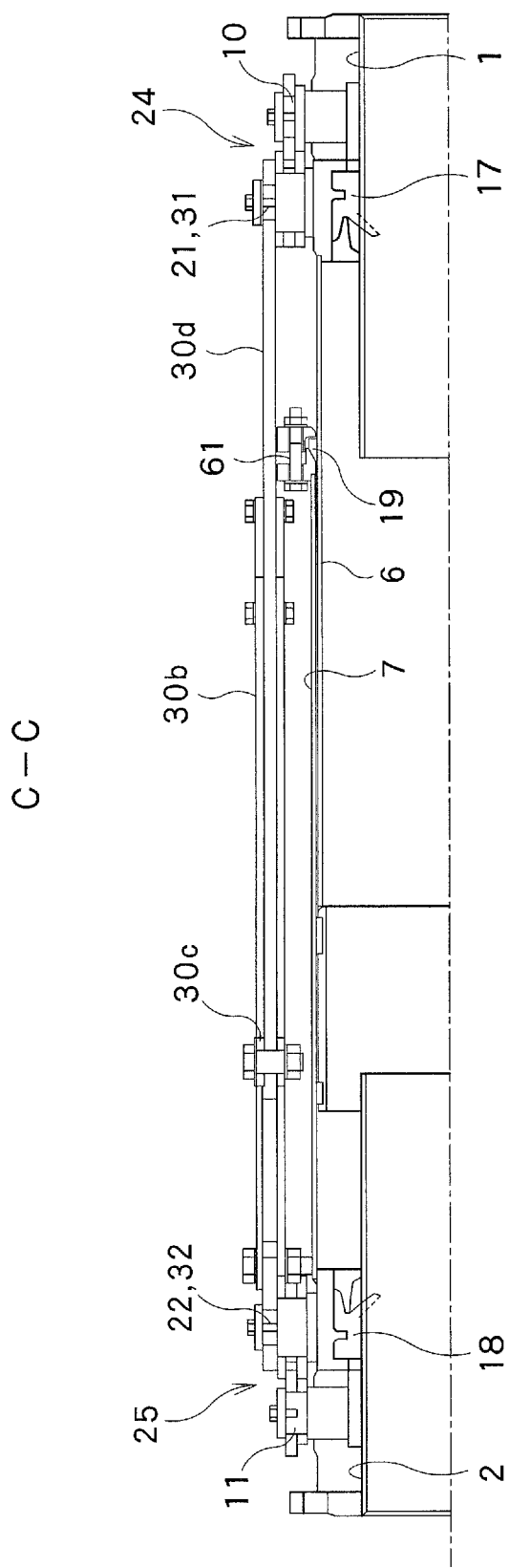
FIG. 29 is a sectional view of the side wall of a flexible expansion joint employed in the tenth embodiment of the present invention.

As shown in FIG. 29, the slotted plate 30b has two plates, and the guide part 30c is held axially slidably by the two plates of the slotted plate 30b from above and below.

One end of the slotted plate 30b may be attached to the first fixed member, and one end of the guide member may be attached to the second fixed member 32

Protective rings 62 and 62a made of a hard rubber are fitted side by side in an annular groove formed in the outside surface of a left end part of a first sleeve 6 so as to be in contact with the inside surface of an outer sleeve 7. The protective rings 62 and 62a ensure, in cooperation with a third sealing member 19, the axial movement of the first sleeve 6 and the outer sleeve 7 relative to each other in a stable position.

FIGS. 27 and 29 show the flexible expansion joint 3 in a standard form at initial installation at the site. The guide part 30c of the guide member 30d is at a position separated from the ends of the third slot 30a. The guide member 30d and the slotted plate 30b overlap partly each other with respect to an axial direction. The flexible expansion joint 3 thus installed in the standard form can smoothly cope with either of extension and contraction under an earthquake or the like.

Figure 30:
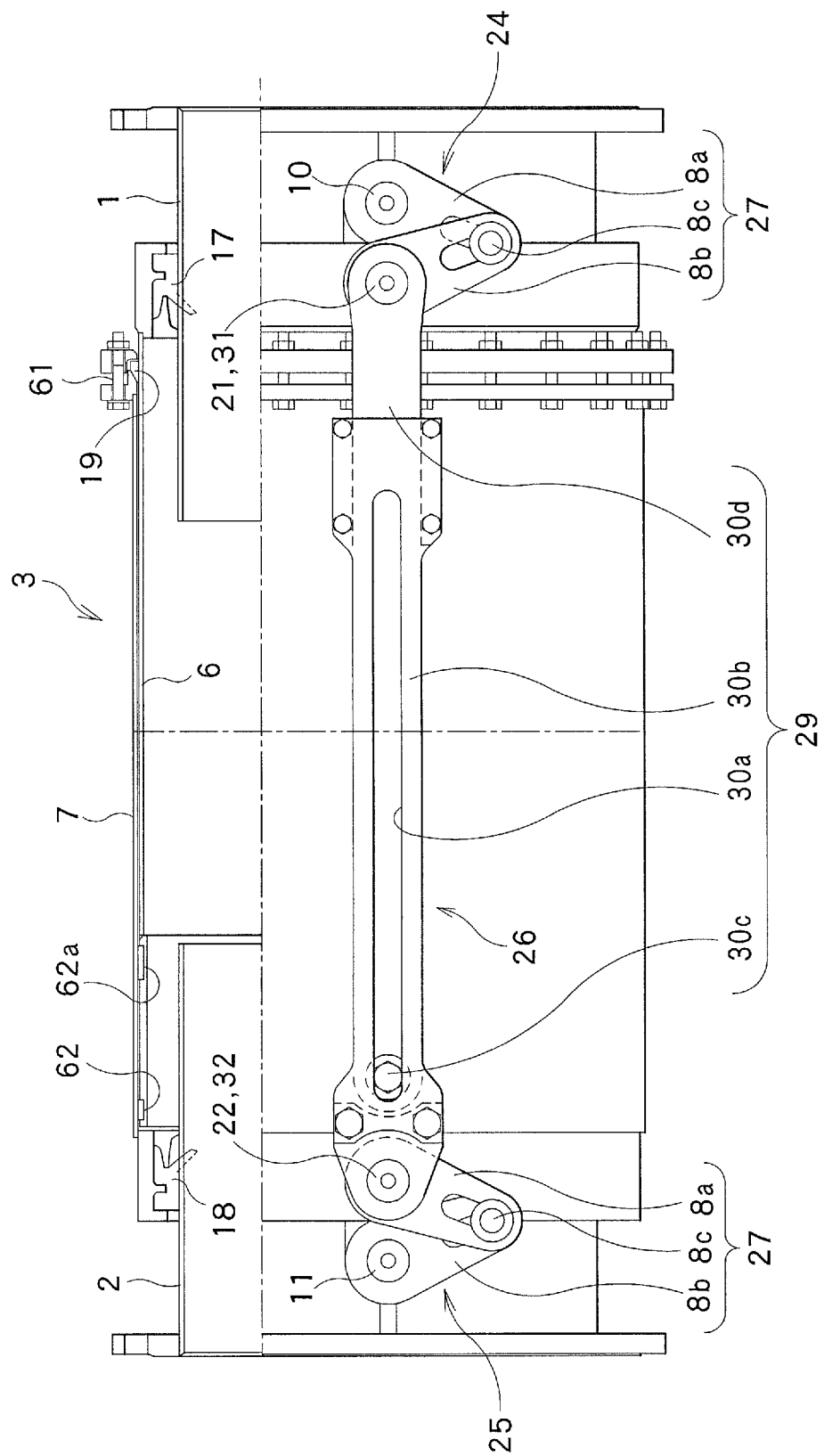
FIG. 30 is a view showing the eleventh embodiment of the present invention, in which the tenth embodiment is axially contracted between pipes.

FIG. 30 shows a state where the distance between the first pipe 1 and the second pipe 2 is reduced by the influence of an earthquake or the like, the flexible expansion joint 3 is fully contracted, the guide part 30c is caused to slide along the third axial slot 30a and to come into contact with the left end of the third axial slot 30a, and the guide member 30d and the slotted plate 39b overlap each other by the longest overlap length.

Figure 31:
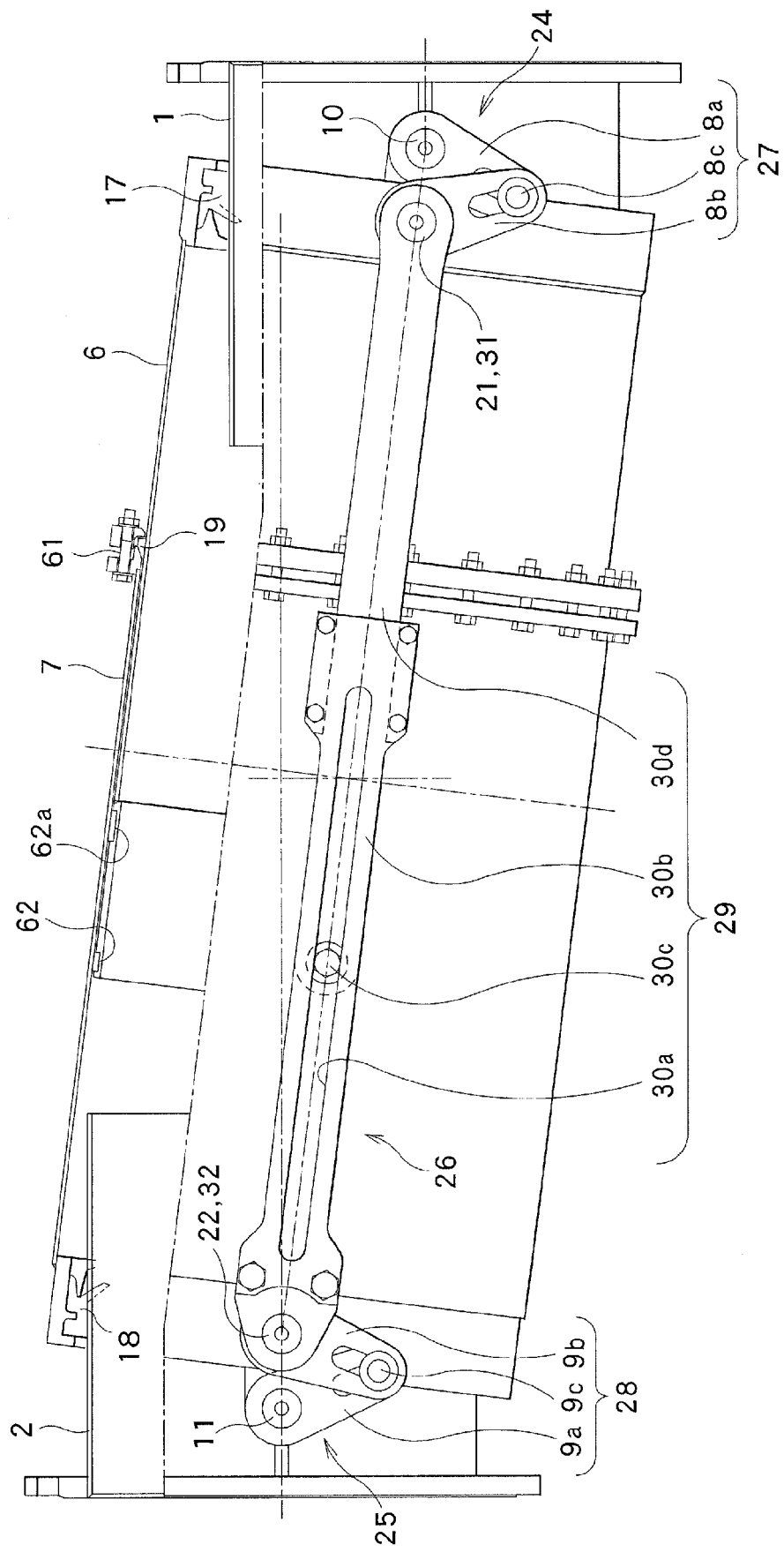
FIG. 31 is a view showing the tenth embodiment of the present invention, in which the pipes are not coaxial and the axial distance between the pipes is changed.

FIG. 31 shows a state where the distance between the first pipe 1 and the second pipe 2 is increased to some extent, the first pipe 1 and the second pipe 2 are not coaxial, and the length of the flexible expansion joint 3 is longer than that of the same in the standard form. The first sealing member 17 and the second sealing member 18 deform and the guide member 30d slides relative to the slotted plate 30b to enable the flexible expansion joint 3 to cope with this state. Thus, the flexible expansion joint 3 can maintain liquid-tight sealed connection with the first pipe 1 and the second pipe 2.

Figure 32:
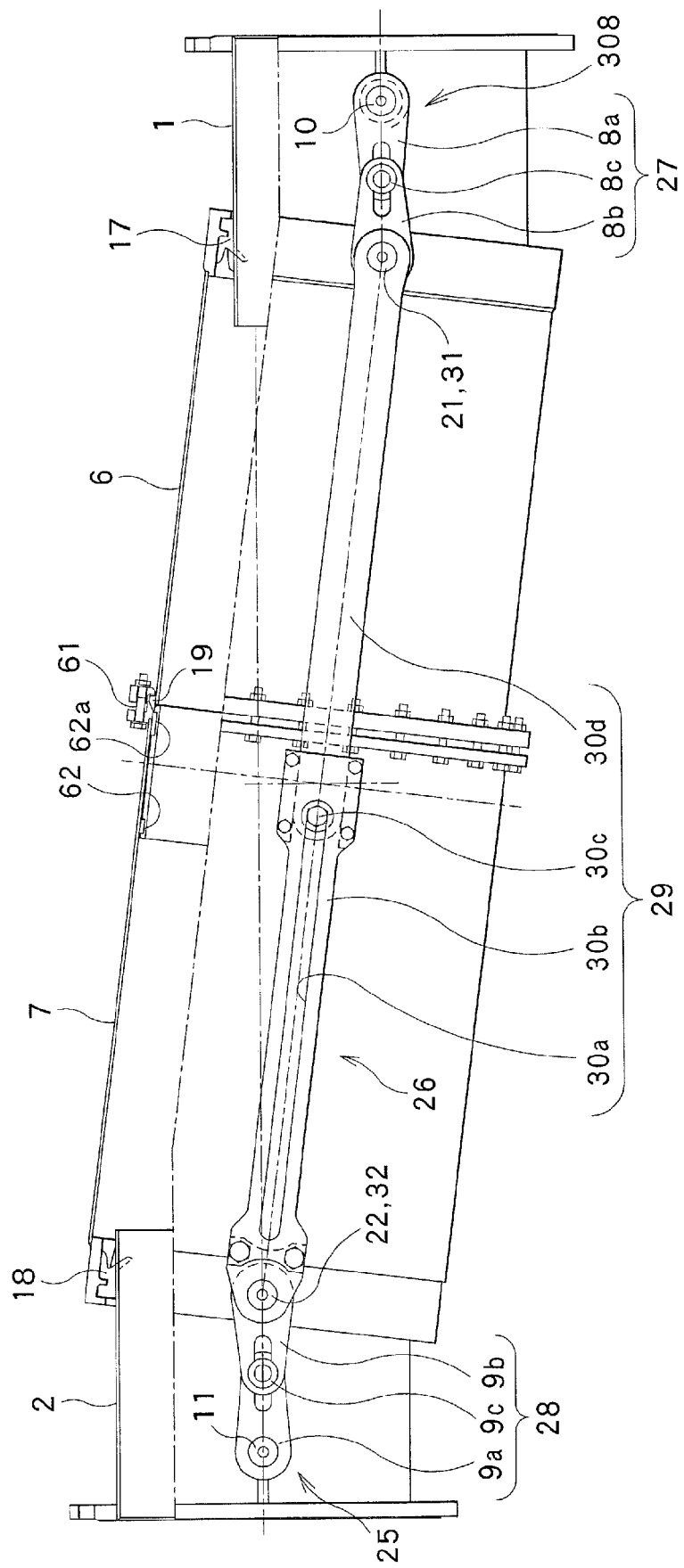
FIG. 32 is a view showing the tenth embodiment of the present invention, in which the pipes are not coaxial and the axial distance between the pipes is changed.
Figure 33:
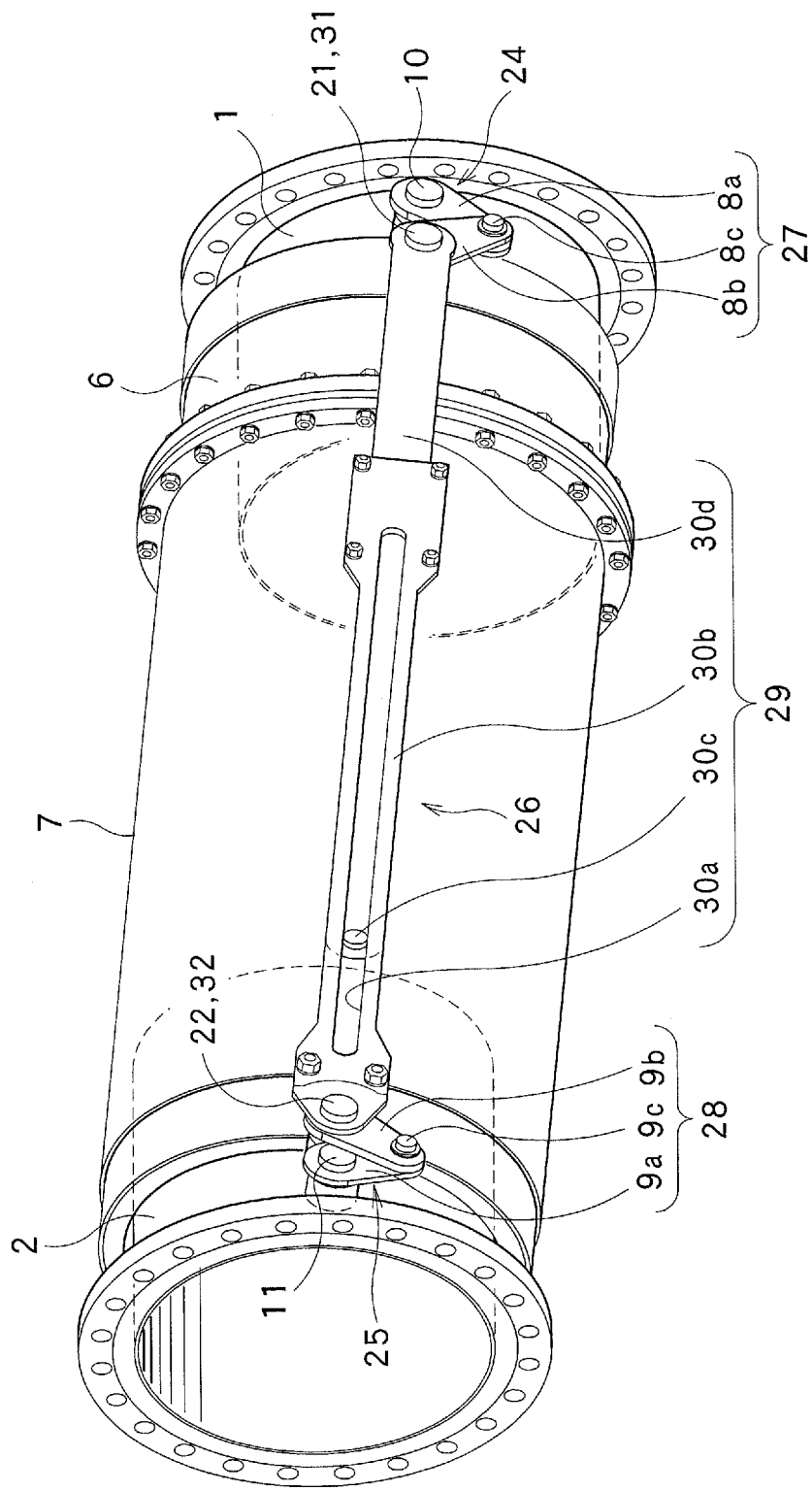
FIG. 33 is a perspective view of the tenth embodiment of the present invention.

FIG. 32 shows a state where increase in the distance between the first pipe 1 and the second pipe 2 is greater than that in the state shown in FIG. 31. A case in which a severe earthquake occurred and a high external force F is produced can be supposed. The first length limiter 24, the second length limiter 25 and the third length limiter 26 function to cope with the high force F.

In the third length limiter 26, the guide part 30c slides along the third axial slot 30a until the guide part 30c reaches the right end of the third axial slot 30a, and the distance between the first reference holder 21 and the second reference holder 22 is equal to the predetermined third limit length L3.

In the first length limiter 24, the first turning member 8a and the first bending member of the first stopper 24 extend straight, and the distance between the first reference member and the first reference holder 21 is equal to the predetermined first limit length L1.

In the second length limiter 25, the second turning member 9a and the second bending member 9b extend straight, and the distance between the second reference member 11 and the second reference holder 22 is equal to the predetermined second limit length L2.

Consequently, the flexible expansion joint 3 is lengthened substantially by a length equal to L1+L2+S to a length equal to L1+L2+2S.

The order of priority in starting action of the first length limiter 24, the second length limiter 25 and third length limiter 26 can be determined by using the first sealing member 17, the second sealing member 18 and the third sealing member 19 respectively having different frictional properties.

The foregoing description is based on an assumption that the third length limiter 26 starts action first. In this case, the external force is not very high at an initial stage and the flexible expansion joint 3 can cope with increase in the distance between the first pipe 1 and the second pipe 2 by the extension of the flexible expansion joint 3 by a length not greater than the predetermined third limit length L3. When the external force F increases further, it is supposed that the first length limiter 24 and the second length limiter 25 act after the distance between the first reference holder 21 and the second reference holder 22 has increased to the third limit length L3.

Normally, it is supposed that the first length limiter 24, the second length limiter 25 and third length limiter 26 start action random, and some parts of periods of actions of the first length limiter 24, the second length limiter 25 and third length limiter 26 overlap.

A flexible expansion joint 3 in an eleventh embodiment of the present invention will be described with reference to FIGS. 27 to 41.

The eleventh embodiment is characterized by the mechanism of its third length limiter 26. The mechanism of the third length limiter 26 of the eleventh embodiment is different from that of the third length limiter 26 of the tenth embodiment. The third length limiter 26 of the tenth embodiment includes the first fixed member 31, the second fixed member 32 and the third stopper 29 and is placed outside the first sleeve 6 and the second sleeve 7. The third length limiter 26 of the eleventh embodiment is placed between the outside surface of a first sleeve 6 and the inside surface of an outer sleeve 7.

Figure 34:
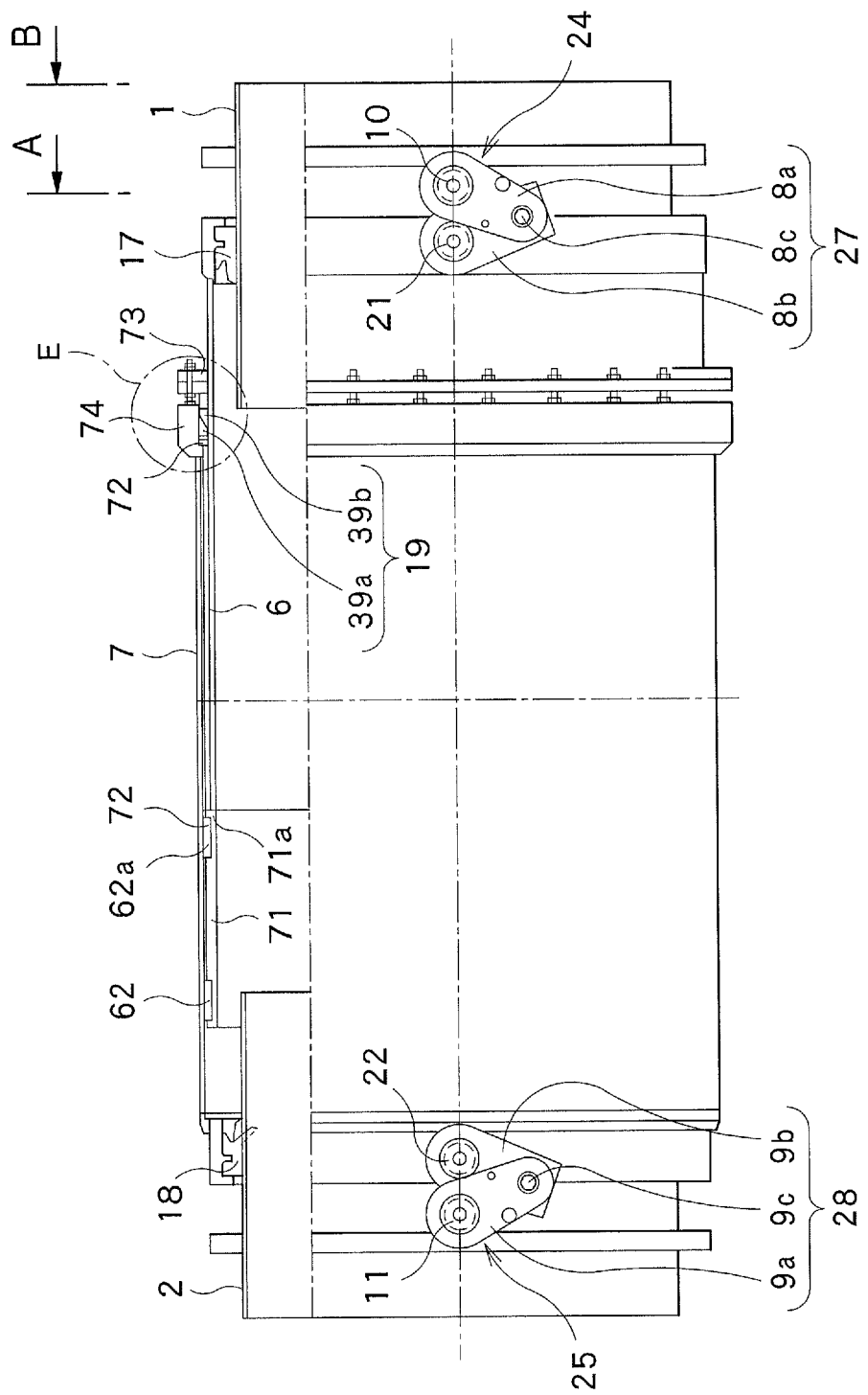
FIG. 34 is a view showing the eleventh embodiment of the present installed in an initial position.
Figure 35:
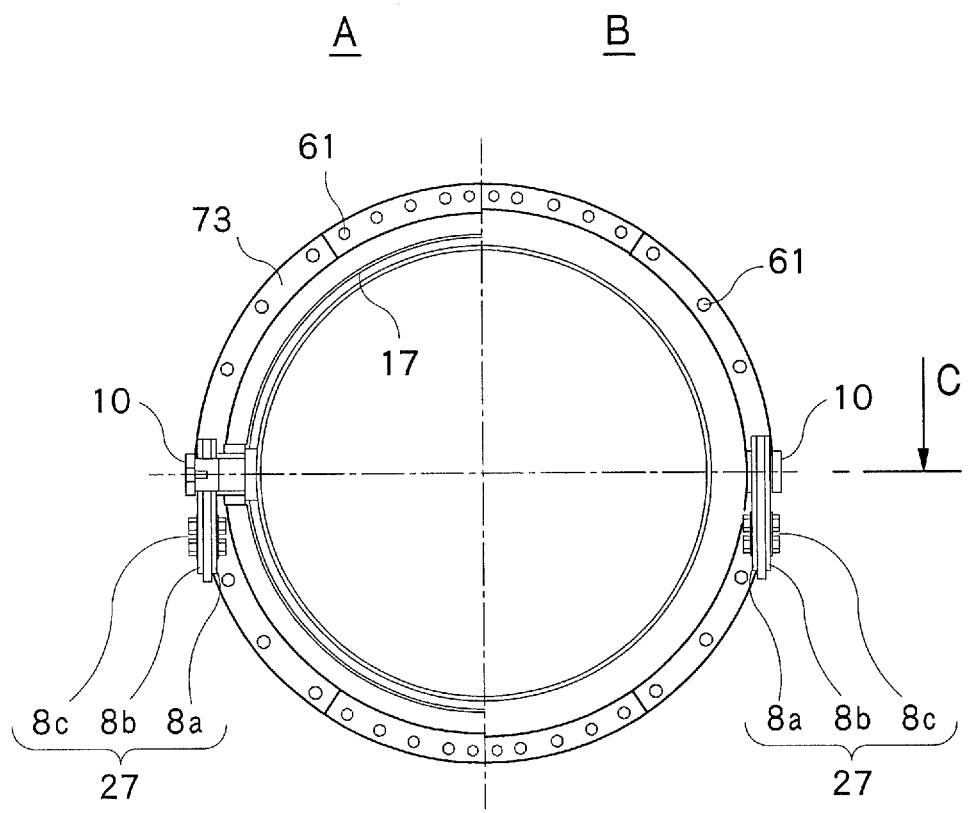
FIG. 35 is an end view taken from a direction A and an end view taken from a direction B in FIG. 34, showing sections of the eleventh embodiment of the present invention.

The third length limiter 26 of the eleventh embodiment includes a first protrusion 71 protruding from the outside surface of one axial end, namely, left end as viewed in FIG. 34, of the first sleeve 6, and a second protrusion 72 protruding from the inside surface of the other axial end, namely, the right end as viewed in FIG. 34, of the outer sleeve 7 and capable of coming into contact with the first protrusion 71.

Figure 36:
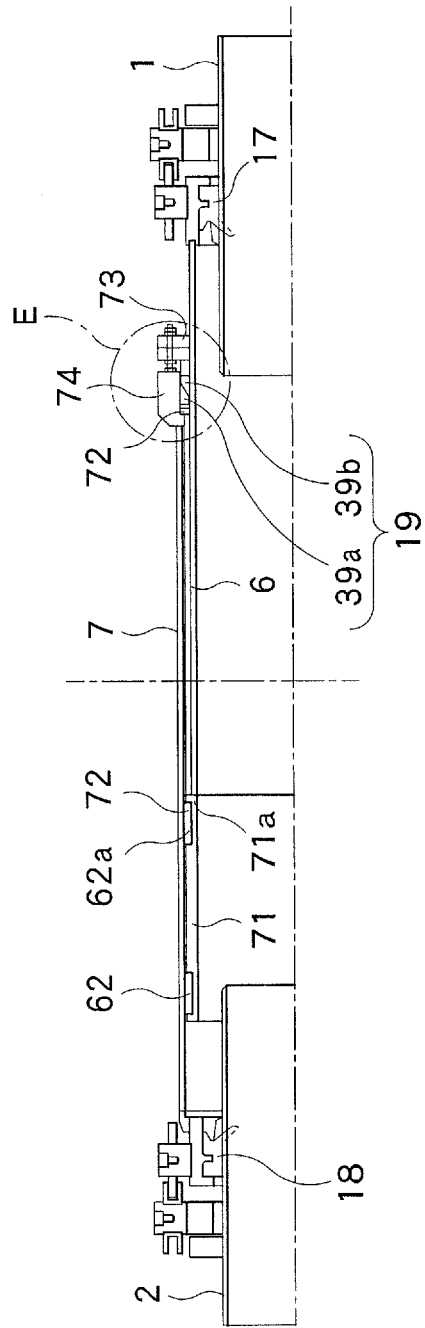
FIG. 36 is a sectional view of the side wall of the eleventh embodiment.
Figure 40:
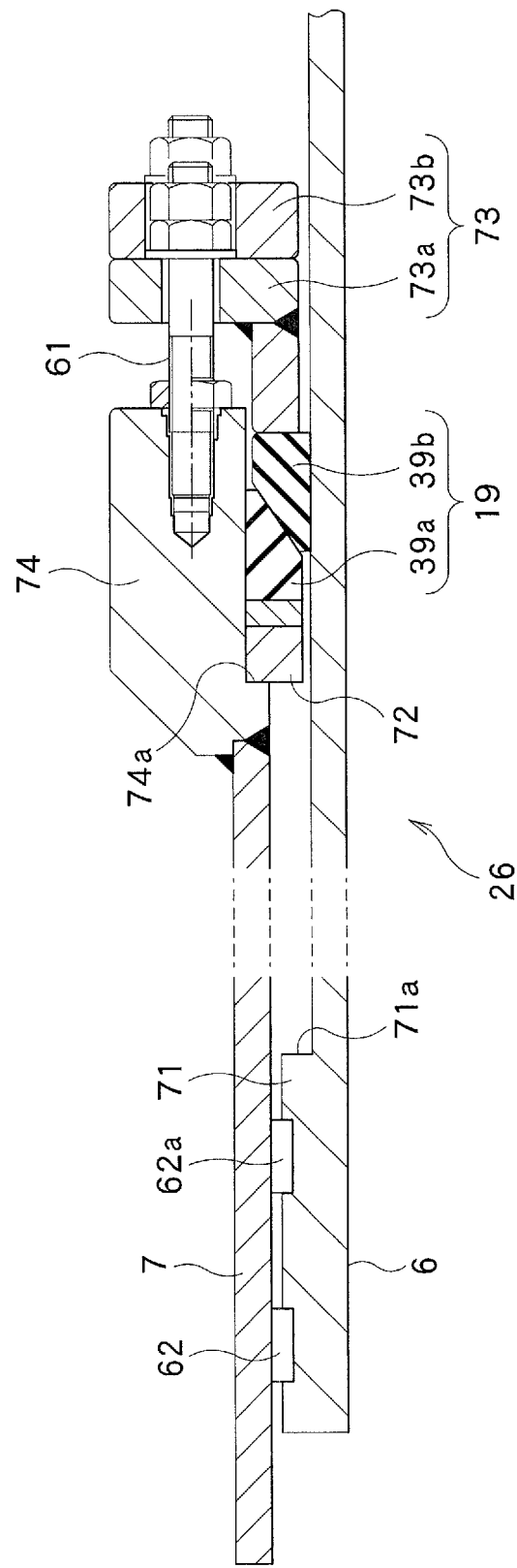
FIG. 40 is an enlarged view of a part E shown in FIGS. 34 and 36.

FIG. 40 is an enlarged view of a part E in FIGS. 34 and 36. As shown in FIG. 40, the first protrusion 71 is formed integrally with the first sleeve 6 and has a shoulder 71a formed at one end thereof on the side of the second protrusion 72.

A flange 74 is welded to the other end of the outer sleeve 7. A third sealing member is fitted in an annular groove formed in the inside surface of the flange 74. The third sealing member 19 includes a sealing member 39a in close contact with the inside surface of the flange 74 continuous with the inside surface of the outer sleeve 7, and a sealing member 39b in close contact with the outside surface of the first sleeve 6. the sealing members 39a and 39b have each a wedge-shaped trapezoidal cross section. The respective sloping surfaces of the sealing members 39a and 30b are in contact with each other. Constrictions are formed in the contact surfaces of each of the sealing members 39a and 39b to provide the sealing members 39a and 39b with an automatic sealing function.

An annular pressing member 73 for pressing the third sealing member 19 against the second protrusion 72 is disposed on the axially outer side of the third sealing member 19. The pressing member 73 includes a pressing ring 73a and a connecting plate 73b. The pressing ring 73a has an L-shaped cross section. The connecting plate 73b has an outside diameter approximately equal to that of the pressing ring 73a. The pressing ring 73a and the connecting plates 73b are axially pressed against a side surface of the flange 74 by bolt-nut fasteners 61.

The second protrusion has an annular shape and is in contact with a shoulder 74a formed in the annular groove of the flange 74. The pressing member 73 presses the third sealing member 19 axially to press the second protrusion 72 against the shoulder 74 of the flange 74. Since the sloping surfaces of the sealing members 39a and 39b having the wedge-shaped cross section are in contact with each other, the sealing member 39a are pressed against the inside surface of the outer sleeve 7 and the sealing member 39b is pressed against the outside surface of the first sleeve.

As the distance between the first pipe 1 and the second pipe 2 increases as the external force F increases, the first sleeve 6 and the outer sleeve 7 move axially relative to each other until the first protrusion 71 and the second protrusion 72 come into contact with each other. Then, the first sleeve 6 and the outer sleeve 7 cannot separate further from each other and the first sleeve 6 and the outer sleeve 7 move together with the first protrusion 71 and the second protrusion 72 held in contact with each other.

Upon the increase of the distance between the first reference holder 21 and the second reference holder 22 to a third limit length at a length below which the gap between the first sleeve 6 and the outer sleeve 7 can remain sealed in a liquid-tight state, the first protrusion 71 and the second protrusion 72 come into contact with each other.

FIGS. 34 and 36 show the flexible expansion joint 3 in a standard form at initial installation at the site. The respective positions of the first sleeve 6 and the outer sleeve 7 are shifted axially by a proper distance relative to each other from positions where the first sleeve 6 and the outer sleeve 7 are positioned when the first sleeve 6 and the outer sleeve are fully nested. When the flexible expansion joint 3 is installed in such a standard form, the flexible expansion joint 3 can extend and contract smoothly under an earthquake or the like.

Figure 37:
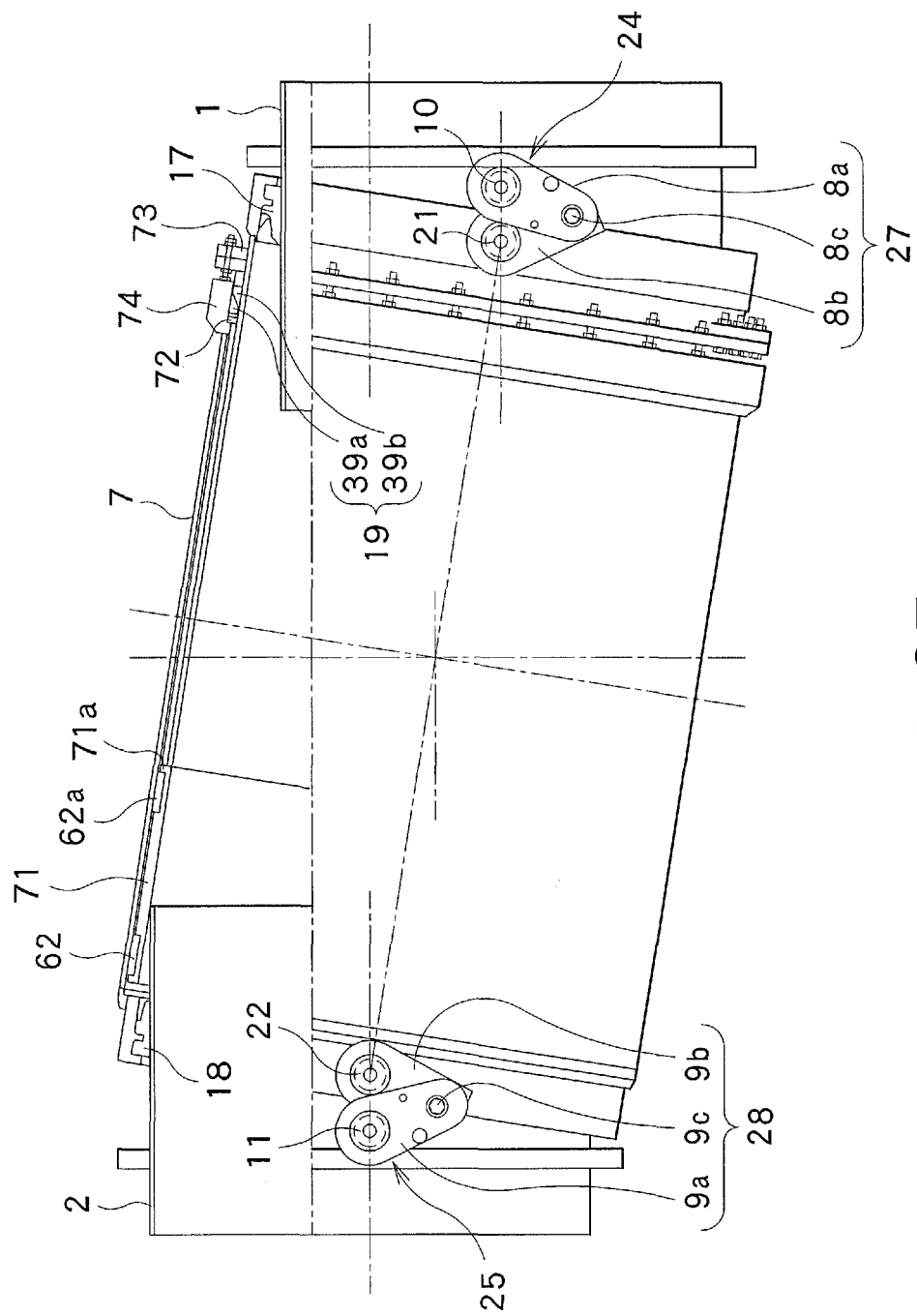
FIG. 37 is a view showing the eleventh embodiment of the present invention, in which pipes are not coaxial.

FIG. 37 shows a state where the distance between the first pipe 1 and the second pipe 2 is reduced and the flexible expansion joint 3 is fully contracted. The first protrusion is at a position corresponding to the left end of the outer sleeve, and the second protrusion is at a position corresponding to the right end of the first sleeve 6.

Figure 38:
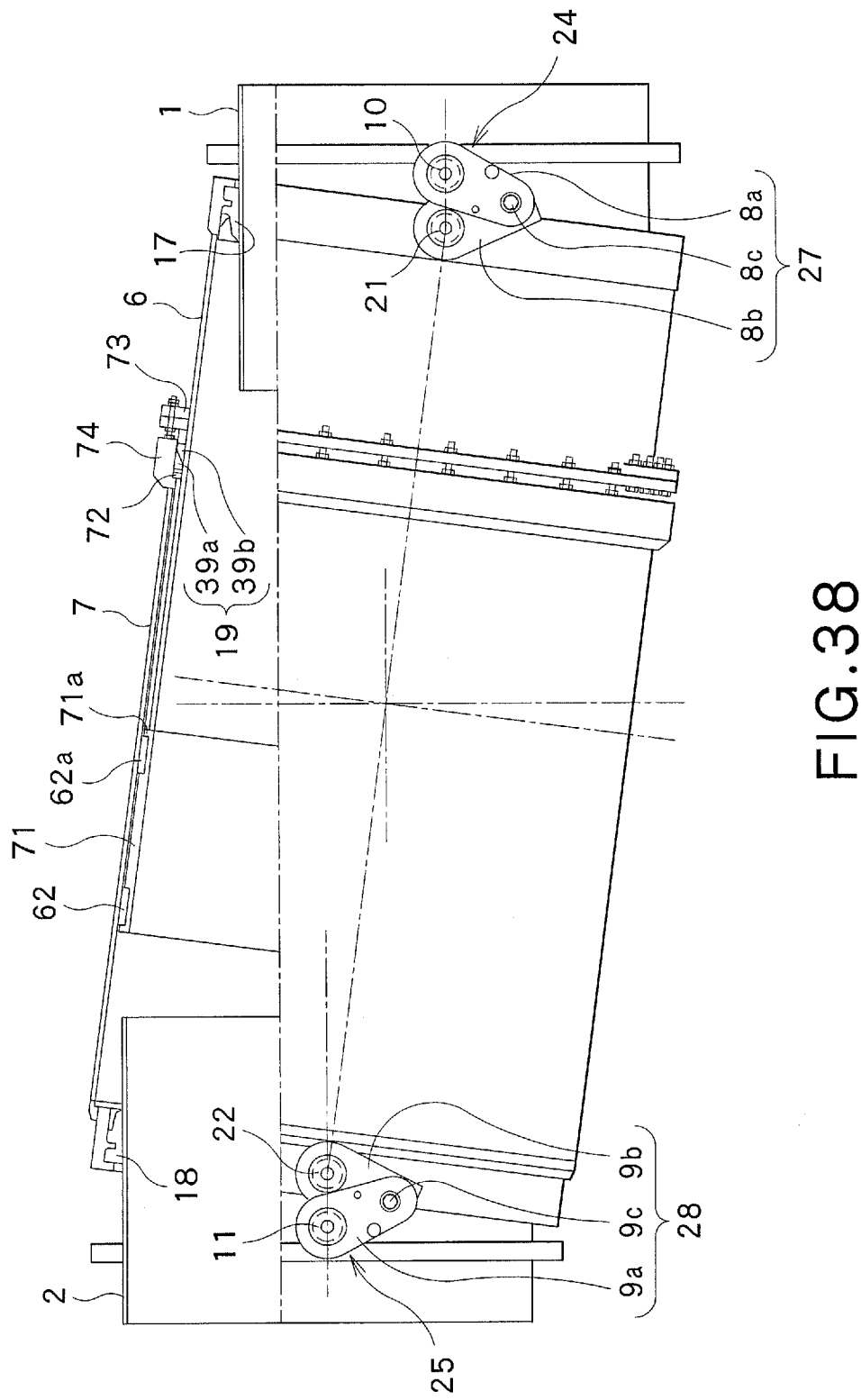
FIG. 38 is a view showing the eleventh embodiment, in which pipes are not coaxial and the distance between the pipes is changed.

FIG. 38 shows a state where the distance between the first pipe 1 and the second pipe 2 is increased by some length, the first pipe 1 and the second pipe 2 are not coaxial, and the flexible expansion joint 3 is extended from its standard form. The flexible expansion joint 3 can cope with such a condition mentioned above by the deformation of the first sealing member 17 and the second sealing member 18 and the axial slide of the first sleeve 6 and the outer sleeve 7 relative to each other. Thus, the flexible expansion joint 3 can maintain liquid-tight sealed connection with the first pipe 1 and the second pipe 2.

Figure 39:
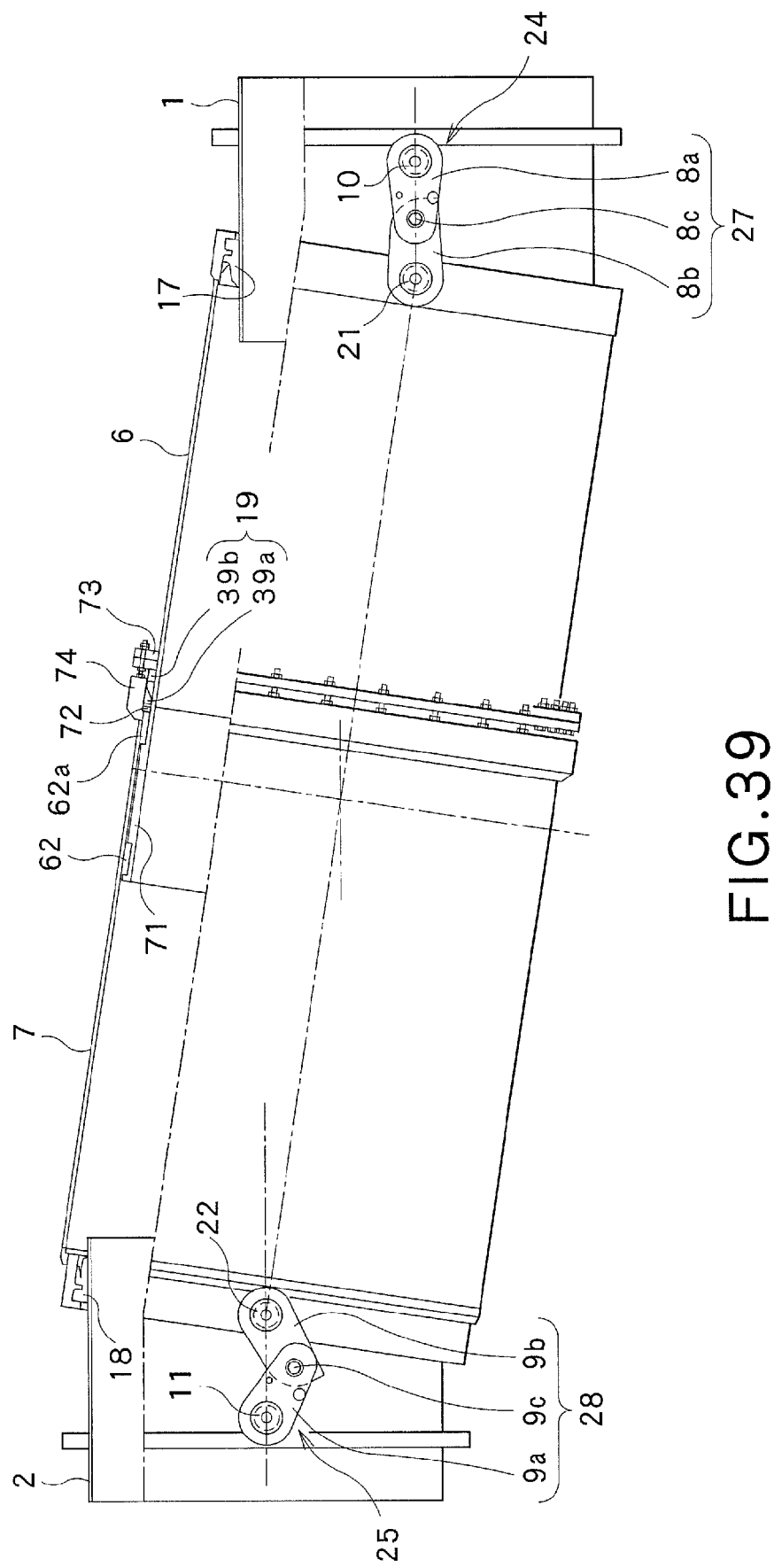
FIG. 39 is a view showing the eleventh embodiment of the present invention, in which pipes are not coaxial and the axial distance between the pipes is greatly changed.

FIG. 39 shows a state where the distance between the first pipe 1 and the second pipe 2 is increased by a length greater than that by which the distance between the first pipe 1 and the second pipe 2 is increased as shown in FIG. 38. In the third length limiter 26, the first protrusion 71 and the second protrusion 72 are in contact with each other, and the distance between the first reference holder 21 and the second reference holder 22 is increased to the third limit length L3. The length of the combination of the first sleeve 6 and the outer sleeve 7 needs to increase beyond an allowable limit length, and hence the first length limiter 24 is stretched to its maximum length. The second length limiter 25 is not stretched to its maximum length and can be stretched still further to permit the further extension of the flexible expansion joint 3.

Since the eleventh embodiment is provided with the first protrusion 71 an the second protrusion 72, the axial movement of the first sleeve 6 and the outer sleeve 7 relative to each other is limited to the third limit length L3 and the first sleeve 6 and the outer sleeve 7 will not be separated from each other even if the distance between the first pipe 1 and the second pipe 2 increases under a high external force.

Since the first protrusion 71 and the second protrusion 72 forming the third length limiter 26 are disposed between the first sleeve 6 and the outer sleeve 7, the third length limiter 26 is concealed from view from outside and has a simple appearance. The third length limiter 26 will not be directly shocked by external impacts and, hence high safety of the function of the third length limiter 26 can be ensured.

FIG. 41(A) is a typical view of the third length limiter 26 shown in FIG. 34 and other drawings. As shown in FIG. 41(A), the second protrusion 72 of the third length limiter 26 is at a position near the third sealing member 19 and the first protrusion 71 is at a distance from the third sealing member 19 in the state shown in FIG. 34.

The form of the eleventh embodiment is not limited to that shown in FIG. 41(A). The second protrusion 72 of the third length limiter 26 may be at a distance from the third sealing member 19 and the first protrusion 71 may be at a position near the third sealing member 19 as shown in FIG. 41(B).

Although some examples of combinations of the first length limiter, the second length limiter and the brake and combinations of the first length limiter, the second length limiter and the third length limiter have been described in the foregoing description of the embodiments, combinations other than those mentioned above are possible. For example, the first length limiter 24 and the second length limiter 25 of the sixth embodiment shown in FIG. 9 and other drawings may be applied to the eighth embodiment shown in FIG. 8. The first length limiter 24 and the second limiter 25 of the sixth embodiment shown in FIG. 9 and other drawings may be applied to the eleventh embodiment shown in FIG. 36 and other drawings.

Figure 13:
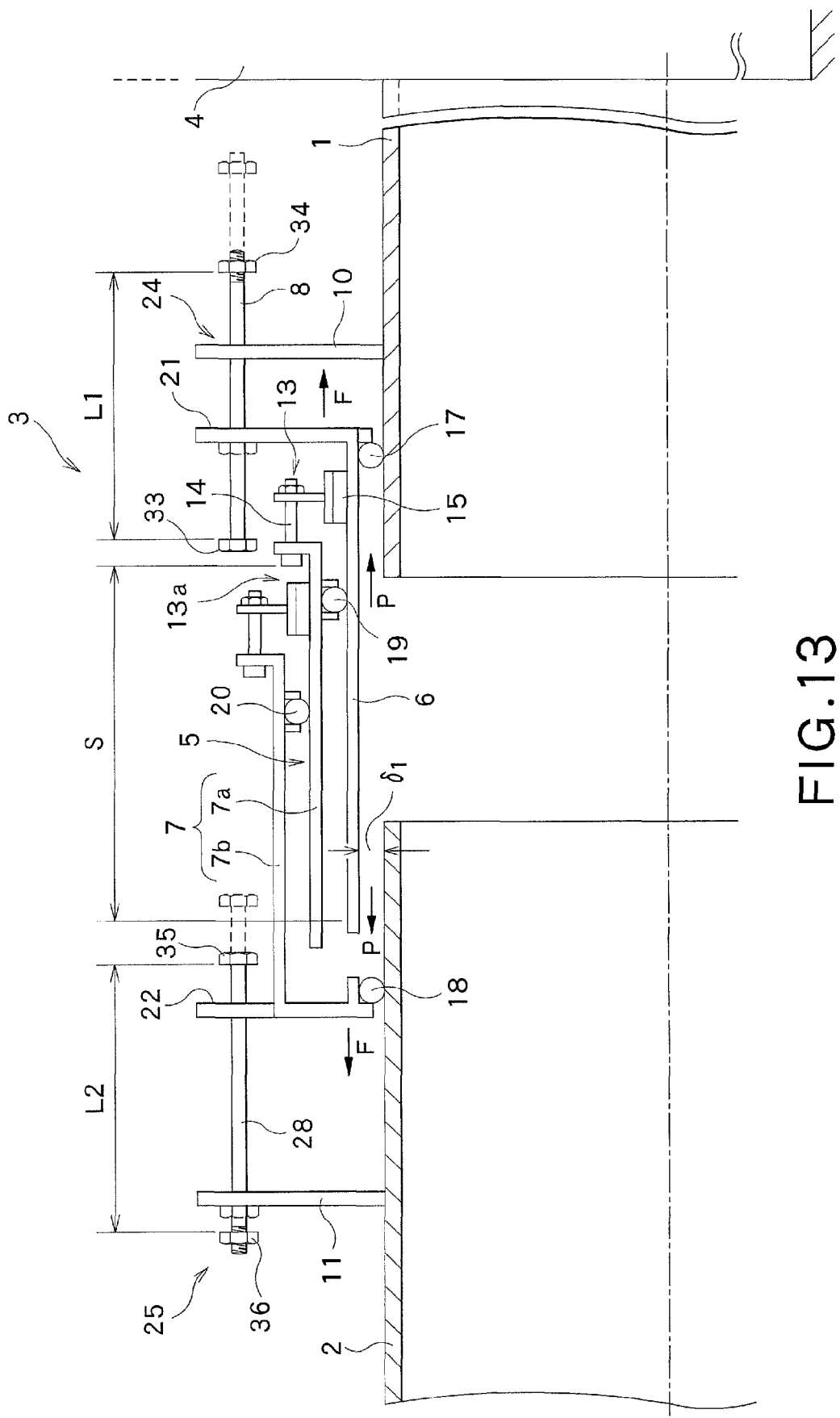
FIG. 13 is a schematic view showing a seventh embodiment of the present invention.

The seventh embodiment described with reference to FIG. 13 is provided additionally with the brake 13 and the outer brake 13a of the second embodiment described with reference to FIG. 5.

The invention claimed is:

1. A flexible expansion joint for connecting a first pipe and a second pipe such that the first pipe and the second pipe are movable and bendable relative to each other, said flexible expansion joint comprising:

a first sleeve to be put on an end part of the first pipe;

an outer sleeve to be put on an end part of a second pipe so as to overlap the first sleeve and capable of moving axially relative to the first sleeve;

a first sealing member sealing a gap between the inside surface of the first sleeve and the outside surface of the first pipe in a liquid-tight sealed state such that the first sleeve and the first pipe are axially movable relative to each other;

a second sealing member sealing a gap between the inside surface of the outer sleeve and the outside surface of the second pipe in a liquid-tight sealed state such that the outer sleeve and the second pipe are axially movable relative to each other;

a third sealing member sealing a gap between the outside surface of the first sleeve and the inside surface of the outer sleeve in a liquid-tight sealed state such that the first sleeve and the outer sleeve are axially movable relative to each other;

a first length limiter including a first reference member placed on the first pipe, a first reference holder formed on the first sleeve, and a first stopper for limiting the axial movement of the first pipe and the first sleeve relative to each other to a predetermined first limit length, the first sealing member being unable to maintain the gap between the inside surface of the first sleeve and the outside surface of the first pipe in a liquid-tight sealed state when a distance between the first reference member and the first reference holder exceeds the predetermined first limit length; and a second length limiter including a second reference member placed on the second pipe, a second reference holder formed on the outer sleeve, and a second stopper for limiting the axial movement of the second pipe and the outer sleeve relative to each other to a predetermined second limit length, the second sealing member being unable to maintain the gap between the inside surface of the outer sleeve and the outside surface of the second pipe in a liquid-tight sealed state when a distance between the second reference member and the second reference holder exceeds the predetermined second limit length, wherein the first stopper, when the first reference holder moves toward an end face of the end part of the first pipe with respect to the first reference member, limits the first reference holder from moving toward the end face of the end part of the first pipe such that the distance between the first reference member and the first reference holder does not exceed the predetermined first limit length, and the second stopper, when the second reference holder moves toward an end face of the end part of the second pipe with respect to the second reference member, limits the second reference holder from moving toward the end face of the end part of the second pipe such that the distance between the second reference member and the second reference holder does not exceed the predetermined second limit length.

2. The flexible expansion joint according to claim 1, wherein the outer sleeve is a single sleeve overlapping the first sleeve.

3. The flexible expansion joint according to claim 1, wherein the outer sleeve is a composite sleeve including plural nested component sleeves.

4. Flexible expansion joint according to claim 1, wherein the first sealing member defines a first gap between the inside surface of the first sleeve and the outside surface of the first pipe, the second sealing member defines a second gap between the outside surface of the second pipe and the inside surface of the outer sleeve, and the first and the second sealing member permit the first and the second pipe to bend relative to each other within a desired range and deform such that the respective sizes of the first and the second gap are adjusted automatically.

5. The flexible expansion joint according to claim 4, wherein at least the first and the second sealing member among the first, the second and the sealing member are lip sealing members.

6. The flexible expansion joint according to claim 1, wherein the first stopper includes a first bolt extended between the first reference member and the first reference holder, and a first nut put on the first bolt, the distance between the first reference member and the first reference holder is equal to the predetermined first limit length when the first nut is in contact with the first reference member or the first reference holder, the second stopper includes a second bolt extended between the second reference member and the second reference holder, and a second nut put on the second bolt, and the distance between the second reference member and the second reference holder is equal to the predetermined second limit length when the second nut is in contact with the second reference member or the second reference holder.

7. The flexible expansion joint according to claim 1, wherein the first stopper includes a first plate extended between the first reference member and the first reference holder and provided with a first axial slot, and a first guide member for guiding the first plate for movement along the first slot, the distance between the first reference member and the first reference holder is equal to the predetermined first limit length when the first guide member is at one end of the first slot, the second stopper includes a second plate extended between the second reference member and the second reference holder and provided with a second axial slot, and a second guide member for guiding the second plate for movement along the second axial slot, and the distance between the second reference member and the second reference holder is equal to the predetermined second limit length when the second guide member is at one end of the second axial slot.

8. The flexible expansion joint according to claim 1, wherein the first stopper includes a first turning member having one end pivotally supported on the first reference member, a first bending member having one end pivotally supported on the first reference holder, and a first pivot pin pivotally connecting the other end of the first turning member and the other end of the first bending member, and the distance between the first reference member and the first reference holder is equal to the predetermined first limit length when the first turning member and the first bending member extend straight, the second stopper includes a second turning member having one end pivotally supported on the second reference member, a second bending member having one end pivotally supported on the second reference holder, and a second pivot pin pivotally connecting the other end of the second turning member and the other end of the second bending member, and the distance between the second reference member and the second reference holder is equal to the predetermined second limit length when the second turning member and the second bending member extend straight.

9. The flexible expansion joint according to claim 1, wherein the first stopper is a first string of a length equal to the predetermined first limit length, and
the second stopper is a second string of a length equal to the predetermined second limit length.

10. The flexible expansion joint according to claim 1, wherein the third sealing member is held by a pair of flanges at a position near one end of the outer sleeve.

11. The flexible expansion joint according to claim 1, further comprising:
a brake that maintains the first sleeve and the outer sleeve in a stationary nested state when an external force acting on the first sleeve to move the first sleeve in a direction opposite a direction in which the end of the first pipe faces and acting on the outer sleeve to move the outer sleeve in a direction opposite a direction in which the end of the second pipe faces is not higher than a predetermined threshold, and nullifies the stationary nested state to allow the movement of the first sleeve and the outer sleeve relative to each other when the external force is higher than the predetermined threshold force.

12. The flexible expansion joint according to claim 11, wherein the outer sleeve includes plural nested component sleeves,
an outer brake is placed in a space between the inner component sleeve and the outer component sleeve surrounding the inner component sleeve among the plural component sleeves to restrain the axial movement of the outer component sleeve relative to the inner component sleeve.

13. The flexible expansion joint according to claim 11, wherein the brake includes a friction member fixed to the outer sleeve so as to be in frictional contact with the outside surface of the first sleeve, and capable of moving together with the first sleeve when the external force is not higher than the threshold and of permitting the axial movement of the outer sleeve relative to the first sleeve when the external force is higher than the threshold.

14. The flexible expansion joint according to claim 11, wherein the brake has a fuse member extended between the outer sleeve and the first sleeve, and capable of remaining extended between the outer sleeve and the first sleeve while the external force is not higher than the threshold and of breaking when the external force exceeds the threshold.

15. The flexible expansion joint according to claim 11, wherein one of the first, the second and the third sealing member functions as a supplementary brake for restraining the axial movement of the outer sleeve relative to the first sleeve.

16. The flexible expansion joint according to claim 1 further comprising:
a first fixed member placed on the first reference holder on the first sleeve, or placed near the first reference holder, a second fixed member placed on the second reference holder on the outer sleeve or placed near the second reference holder, and a third stopper for limiting the axial movement of the first sleeve and the outer sleeve relative to each other to a predetermined third limit length, the third sealing member being unable to maintain the gap between the outside surface of the first sleeve and the inside surface of the outer sleeve in a liquid-tight sealed state when a distance between the first fixed member and the second fixed member exceeds the predetermined third limit length.

17. The flexible expansion joint according to claim 16, wherein the third stopper includes a slotted plate having one end attached to either the first fixed member or the second fixed member and provided with a third axial slot, and a guide member having one end attached to either the second fixed member or the first fixed member and having a guide part fitted in the third slot, and the distance between the first and the second fixed member is equal to the predetermined third limit length when the guide part is at one end of the third slot.

18. The flexible expansion joint according to claim 16, wherein the third stopper is a third string of a length equal to the predetermined third limit length.

19. The flexible expansion joint according to claim 1 further comprising:
a third length limiter including a first protrusion protruding from the outside surface of one axial end of the first sleeve, and a second protrusion protruding from the inside surface of the other axial end of the outer sleeve and capable of coming into contact with the first protrusion, wherein the first and the second protrusion come into contact with each other to limit the distance between the first and the second reference holder to a distance not longer than a predetermined third limit length equivalent to an allowable limit length at a length above which the third sealing member is unable to maintain the gap between the first sleeve and the outer sleeve in a liquid-tight sealed state.

* * * * *